(12) United States Patent
Klein

(10) Patent No.: US 9,191,305 B2
(45) Date of Patent: Nov. 17, 2015

(54) CONVERGENT NETWORK ARCHITECTURE AND PATH INFORMATION

(75) Inventor: Philippe Klein, Jerusalem (IL)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 13/334,414

(22) Filed: Dec. 22, 2011

(65) Prior Publication Data

US 2012/0239794 A1 Sep. 20, 2012

Related U.S. Application Data

(60) Provisional application No. 61/452,622, filed on Mar. 14, 2011, provisional application No. 61/452,627, filed on Mar. 14, 2011, provisional application No. 61/481,162, filed on Apr. 30, 2011.

(51) Int. Cl.
*G06F 15/173* (2006.01)
*H04L 12/28* (2006.01)
*H04L 12/721* (2013.01)

(52) U.S. Cl.
CPC ............... *H04L 45/12* (2013.01); *H04L 45/66* (2013.01)

(58) Field of Classification Search
CPC ....... H04L 45/00; H04L 47/10; H04L 49/351; H04L 29/0653; H04L 29/06; H04L 45/28; H04L 45/22; H04L 29/14; H04L 12/2422
USPC .......................................... 370/225; 709/223
See application file for complete search history.

(56) References Cited

U.S. PATENT DOCUMENTS

| 6,115,750 A | 9/2000 | Dillon |
| 2007/0245033 A1 | 10/2007 | Gavrilescu |
| 2008/0151907 A1* | 6/2008 | Ge et al. .................. 370/395.53 |

(Continued)

FOREIGN PATENT DOCUMENTS

WO 2010094595 A1 8/2010

OTHER PUBLICATIONS

European Search Report; EP Application No. 12001547.4-2416; Jul. 2, 2012; 4 pgs.

(Continued)

*Primary Examiner* — Emmanuel L Moise
*Assistant Examiner* — Mahran Abu Roumi
(74) *Attorney, Agent, or Firm* — Garlick & Markison; Shayne X. Short

(57) ABSTRACT

Convergent network architecture and path information. Within a convergent network composed of different respective networks, each respective network may be controlled or managed internally and independently with respect to the other networks. For example, each respective network includes a forwarding and link metrics database and is managed by its own respective control entity (e.g., which may be any one of the given devices were nodes within that network). Generally speaking, each respective network may be modeled as an Ethernet bridge such that each respective bridge natively maintains its own forwarding and link metrics database. Such link metrics are specific to a given network and may cover one or both of prioritized Quality of Service (QoS) and parameterized QoS. Relays between neighboring bridges may effectively propagate and/or forward their respective databases, and update of any given database may be made asynchronously or based on a neighboring bridge query.

20 Claims, 21 Drawing Sheets

(56) References Cited

U.S. PATENT DOCUMENTS

| | | | |
|---|---|---|---|
| 2008/0240106 A1* | 10/2008 | Schlenk | 370/392 |
| 2009/0116404 A1 | 5/2009 | Mahop | |
| 2010/0150154 A1* | 6/2010 | Viger et al. | 370/389 |
| 2010/0238798 A1 | 9/2010 | Ahuja | |
| 2011/0038381 A1 | 2/2011 | Oren | |
| 2012/0063301 A1* | 3/2012 | Schel | 370/225 |
| 2013/0002409 A1* | 1/2013 | Molina et al. | 340/12.32 |
| 2013/0055097 A1* | 2/2013 | Soroca et al. | 715/738 |

OTHER PUBLICATIONS

European Search Report; EP Application No. 12001548.2-2416; Aug. 1, 2012; 3 pgs.

IEEE Standard for Local and metropolitan area networks; Virtual Bridged Local Area Networks, Amendment 14: Stream Reservation Protocol (SRP); IEEE Std. 802.1Qat-2010, (Amendment to IEEE Std 802.1Q-2005), Sep. 30, 2010, 118 pgs.

Nowak, Stefan, "Enabling Convergent Digital Home Networks for Heterogeneous Technoligies", 3rd Omega Open Event 2011 Inter-Mac, Feb. 24, 2011, pp. 1-94.

IEEE Draft; Liaison-P1905-1-to-802-1-0111, IEEE-SA, Piscatawny, NJ, US, vol. 802.1, Jan. 17, 2011, p. 1.

* cited by examiner

| | |
|---|---|
| P1905.1 Device | A device that is either a P1905.1 Relay or a P1905.1 Terminal |
| P1905.1 Relay | A network device containing a P1905.1 Abstraction Layer between its LLC and the underlying P1905.1 supported MAC/PHY(s) able to relay P1905.1 management frames and data frames to other 1905.1 devices |
| P1905.1 Terminal | A network device containing a P1905.1 Abstraction Layer between its LLC and the underlying P1905.1 supported MAC/PHY(s) able to relay P1905.1 management frames to other 1905.1 devices |
| P1905.1 Link | A logical link between the P1905.1 Abstraction Layer of two particular P1905.1 devices at the MAC_SAP of their respective underlying P1905.1 supported MACs |
| P1905.1 Network | A set of 1905.1 Devices and 1905.1 Links between those devices, as long as each 1905.1 Device has a P1905.1 Management Path to every other P1905.1 Device and at least one P1905.1 Data Path to another P1905.1 Device |
| P1905.1 Management Path | A continuous ordered list of bidirectional P1905.1 Link(s) between P1905.1 devices - that is, each successive subset of two links in the ordered list shares one and only one 1905.1 Device |
| P1905.1 Data Path | A continuous ordered list of unidirectional or bidirectional P1905.1 Link(s) between P1905.1 - that is, each successive subset of two links in the ordered list shares one and only one 1905.1 Relay |

900

\* definitions

FIG. 9

FIG. 13 • FWD and Link Metrics Information Propagation (1)

FIG. 14 • FWD and Link Metrics Information Propagation (2)

• FWD and Link Metrics Information Propagation Update (2)

| Primitive | Request | Indicate | Confirm | Response |
|---|---|---|---|---|
| P1905-MLME-BOUND-MAC | Request the enumerated list and handles to the MACs bound to the P1905.1 Abstraction Layer | | | Return the enumerated list and handles to the MACs bound to the P1905.1 Abstraction Layer |
| P1905-MLME-SET-PARAMS | Set P1905.1 Abstraction Layer configuration parameters | | Confirm the parameter configuration specified in the associated P1905-MLME-SET-PARAS primitive | |
| P1905-MLME-PATH-INFO | Request the Path information of one/all the MACs bound to the P1905.1 Abstraction Layer | Indicate a change in the Path information of one/all the MACs bound to the P1905.1 Abstraction Layer | | Request the Path information of one/all the MACs bound to the P1905.1 Abstraction Layer |
| P1905-MLME-SET-PATH | Select a P1905.1 Path for a given data flow | | Confirm the P1905.1 Path selection specified in associated P1905-MLME-SET-PATH primitive | |
| P1905-MLME-PATH_UPDATE | Start / Stop the Path Update Round Robin Process between the Relay's Links Restart the Round Robin out of order from a specified Relay's Link. | | | |

2000

- P1905.1 MLME APIs

FIG. 20

CONVERGENT NETWORK ARCHITECTURE AND PATH INFORMATION

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional Patent Applications which are hereby incorporated herein by reference in their entirety and made part of the present U.S. Utility patent application for all purposes:
1. U.S. Provisional Patent Application Ser. No. 61/452,622, entitled "Convergent network topology discovery and mapping,", filed Mar. 14, 2011.
2. U.S. Provisional Patent Application Ser. No. 61/452,627, entitled "Stream path selection within convergent networks,", filed Mar. 14, 2011.
3. U.S. Provisional Patent Application Ser. No. 61/481,162, entitled "Convergent network architecture and path information,", filed Apr. 30, 2011.

INCORPORATION BY REFERENCE

The following U.S. Utility patent applications are hereby incorporated herein by reference in their entirety and made part of the present U.S. Utility patent application for all purposes:
1. U.S. Utility patent application Ser. No. 13/334,245, entitled "Convergent network topology discovery and mapping,", filed concurrently on Dec. 22, 2011, pending.
2. U.S. Utility patent application Ser. No. 13/334,328, entitled "Stream path selection within convergent networks,", filed concurrently on Dec. 22, 2011, pending.

INCORPORATION BY REFERENCE

The following IEEE standards/IEEE draft standards are hereby incorporated herein by reference in their entirety and are made part of the present U.S. Utility patent application for all purposes:
1. IEEE Std 802.1AB™—2009 (Revision of IEEE Std 802.1AB™—2005), IEEE Standard for Local and Metropolitan Area Networks—Station and Media Access Control Connectivity Discovery, IEEE Computer Society, Sponsored by the LAN/MAN Standards Committee, 17 Sep. 2009, 204 pages.
2. IEEE P802.1Q-REV/D1.5, March 2011, IEEE Approved Draft Standard for Local and Metropolitan Area Networks—Media Access Control (MAC) Bridges and Virtual Bridged Local Area Networks, 29 Aug. 2011, 1376 pages.
3. IEEE P1905.1™/D01.00, 13 Dec. 2011, 1905_1-11-0101-00-WGDC CDHN, IEEE P1905.1™/D01.00 Draft Standard for Convergent Digital Home Network for Heterogeneous Technologies, Sponsor: Standards Committee of the IEEE Communications Society, IEEE-SA Standards Board, Prepared by the P1905.1 Working Group of the IEEE Communications Society, 79 total pages.

BACKGROUND OF THE INVENTION

1. Technical Field of the Invention

The invention relates generally to communication systems; and, more particularly, it relates to convergent networks composed of any number of different respective network types.

2. Description of Related Art

Data communication systems have been under continual development for many years. One particular type of communication system is particularly related to heterogeneous networking technologies which may be implemented in accordance with home networking technologies. For example, within certain such network environments, as few as one or two or more different types of different respective network technologies may be implemented in accordance with a common abstract layer for supporting communications among such different network technologies.

As an example, different types of networks that may be implemented within such a heterogeneous networking technology environment may be varied. In addition, while it is noted that such different types of networks may be implemented within such a heterogeneous networking technology environment, the present art does not provide a means by which different respective networks may operate effectively and seamlessly with respect to another. For example, within any one respective network, there may be multiple respective communication links therein. Moreover, different respective networks may interface with respect to one another at more than one node or point.

The prior art fails to provide for effective operation of such heterogeneous networking technologies in regards to a number of issues including considerations such as network management, neighbor discovery, topology discovery, path selection, network control and management. While research and development continues in attempts to address these and other deficiencies within such convergent networks employing heterogeneous technologies, the prior art does not adequately provide acceptable solutions to allow for high levels of performance and broad implementation of such convergent networks.

BRIEF DESCRIPTION OF THE SEVERAL VIEWS OF THE DRAWINGS

FIG. 9 illustrates an embodiment of various definitions as may be employed in accordance with convergent networks.

FIG. 20 illustrates an embodiment of media access control (MAC) sub-layer management entity (MLME) APIs.

DETAILED DESCRIPTION OF THE INVENTION

Figure 1:
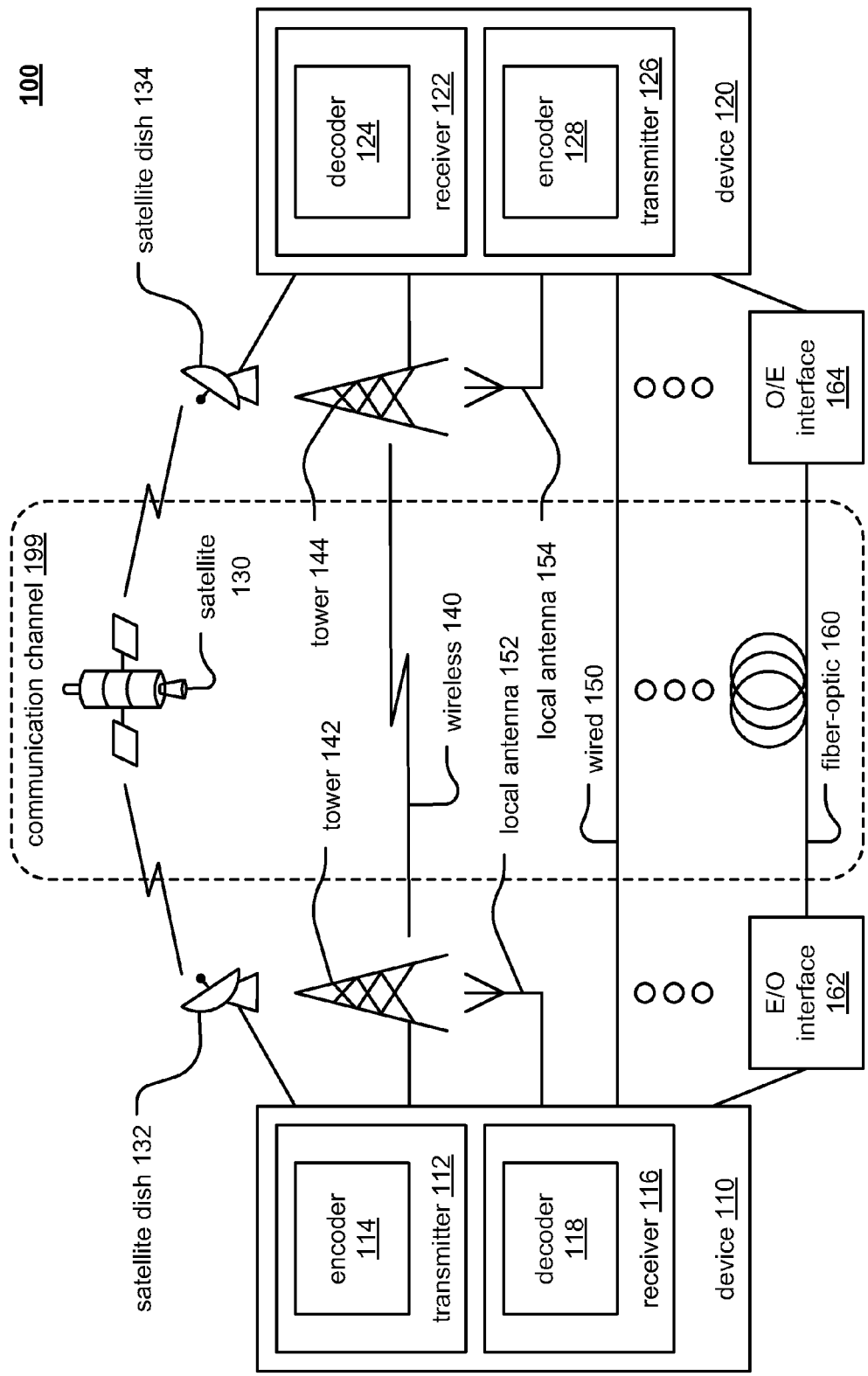
FIG. 1, FIG. 2, FIG. 3, and FIG. 4 illustrate various embodiments of communication systems.

Within communication systems, signals are transmitted between various communication devices therein. The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well.

FIG. 1, FIG. 2, FIG. 3, and FIG. 4 illustrate various embodiments of communication systems, 100, 200, 300, and 400, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video decoding capability, or vice versa (e.g., in a uni-directional communication embodiment such as in accordance with a video broadcast embodiment).

Figure 2:
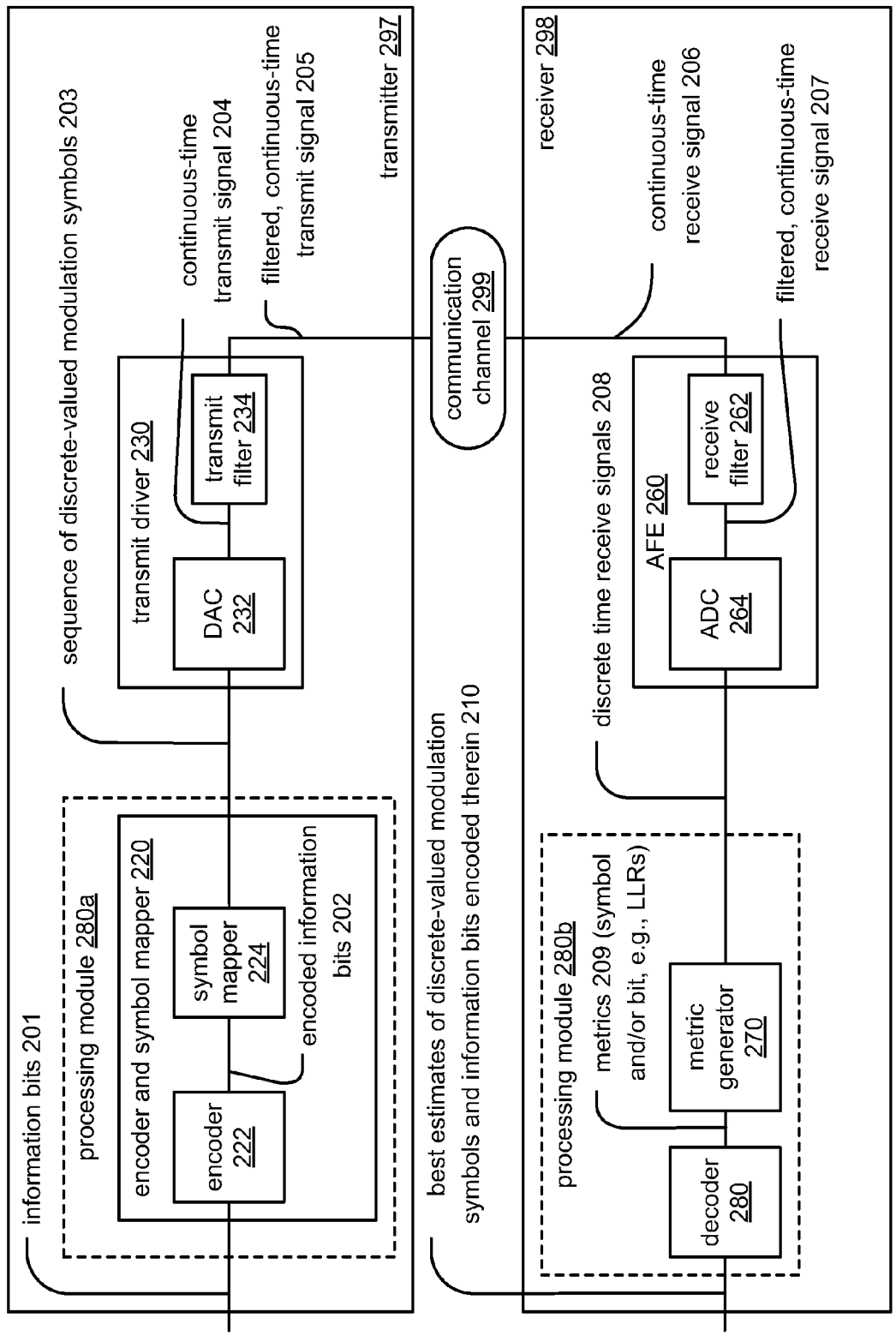

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct elements as shown in the diagram, namely, encoder 222 and symbol mapper 224 such that the encoder 222 generates encoded information bits 202 that get provided to the symbol mapper 224) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. Therein may be implemented. For example, this diagram shows a processing module 280a as including the encoder and symbol mapper 220 and all associated, corresponding components therein, and a processing module 280 is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Figure 3:
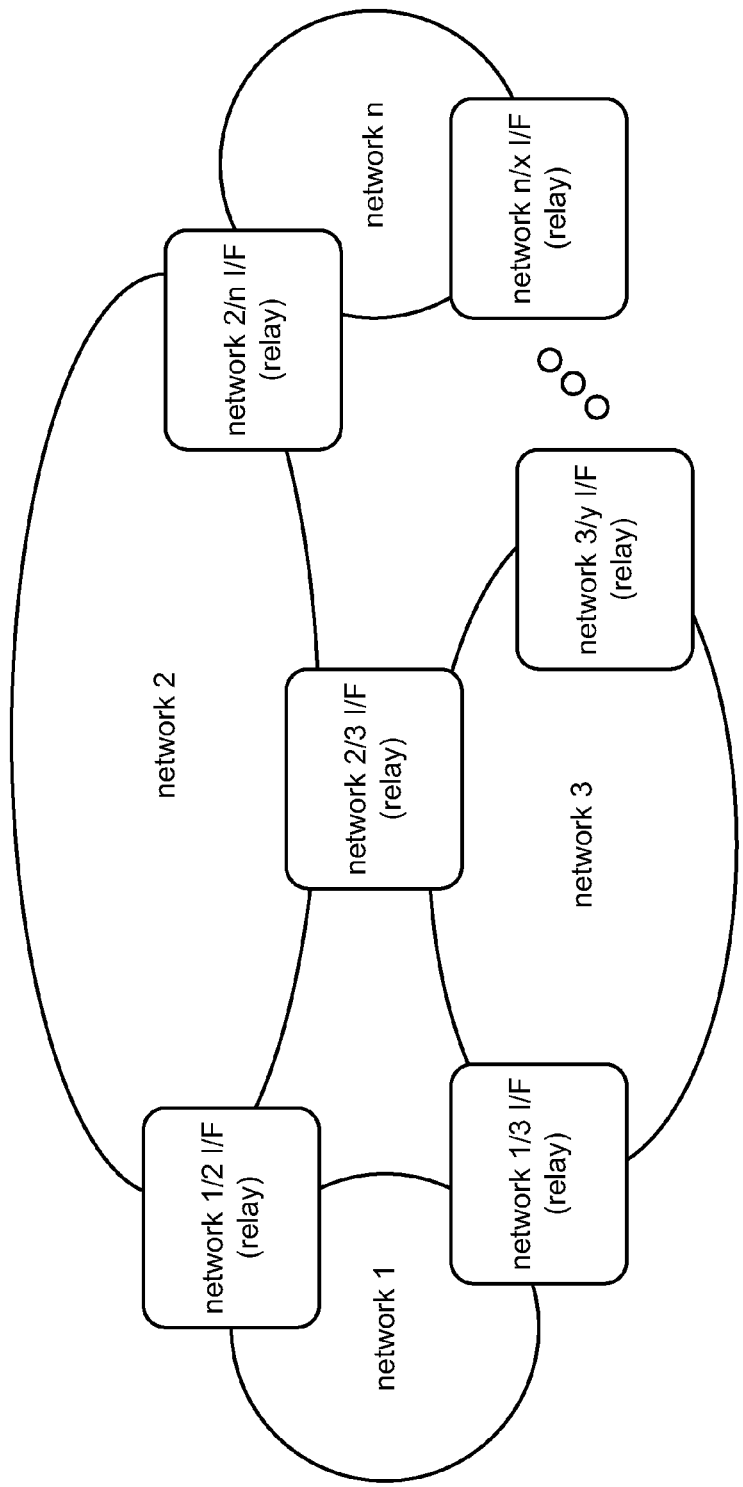

Referring to the embodiment 300 of FIG. 3, such a communication system may generally be viewed as including multiple networks that can interface with each other. Generally speaking, such an embodiment 300 can include a network 1, a network 2, a network 3, and so on up to a network n (e.g., where n is an integer). Such an overall communication system, composed of multiple networks, can generally be referred to as a convergent network (e.g., in which multiple networks are converged with one another thereby generating or forming a larger communication system, namely, a convergent network).

To interface communications between the respective networks, certain interfaces (e.g., relays) may be implemented within certain communication devices that are operative to communication with at least two of the types of network. In some embodiments, a given communication device may include functionality to interface with more than two networks (e.g., 3 networks, 4, networks, etc.). As may be seen in the diagram, an interface by which communications are made between two of the networks is via a network interface (or relay). As some specific examples, communications made between network 1 and network 2 are made via network 1/2 interface (or relay); communications made between network 1 and network 3 are made via network 1/3 interface (or relay); communications made between network n and network x are made via network n/x interface (or relay); and so on.

Generally speaking, for a communication device to support communications with more than one network will typically result in greater functionality and/or complexity of such a communication device. In some embodiments, a given communication device includes functionality to interface with and support communications with, at most, two of the networks within the overall communication system or convergent network.

Of course, some of the communication devices therein only include functionality to interface with and support communications with one of the networks within the overall communication system or convergent network. When such a communication device (e.g., one including functionality to interface with and support communications with one of the networks) communicates with another communication device including functionality to interface with and support communications with another one of the networks, such communications are made via at least one interface (or relay) by which communications are made from one network to another.

The types of networks that the networks 1 to n may represent may be varied. For examples, such networks may be wired networks, wireless network, optical networks, cellular networks, satellite networks, power line based networks, etc. Of course, certain of these networks may not only operate in accordance with different types of media (e.g., wired, wireless [air], optical, etc.), but certain of these networks may operate in accordance with different communication standards, protocols, and/or recommended practices.

Figure 4:
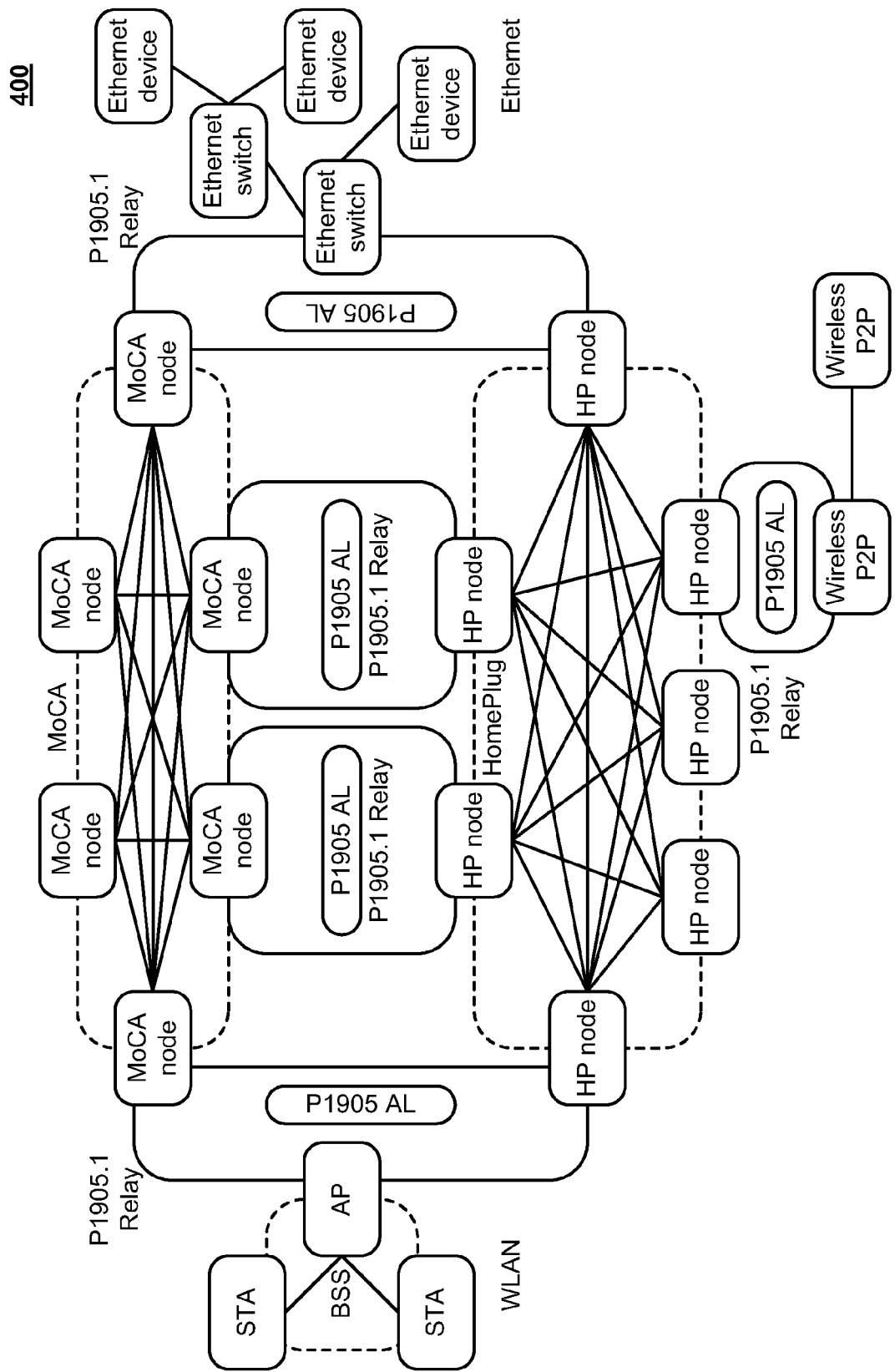

Referring to the embodiment 400 of FIG. 4, such a communication system is a convergent network including interfacing and supporting of communications between various types of communication networks. This diagram particularly depicts a wireless local area network (WLAN/WiFi), a multimedia over coax alliance (MoCA®, or generally referred to as MoCA) network, a local area network (LAN) such as one that operates in accordance with Ethernet or in accordance with IEEE 802.3, a HomePlug network (e.g., a communication network operating in accordance with various power line communication standards, protocols, and/or recommended practices and can operate using power system related hardware and infrastructure), and/or a wireless point to point (P2P) system (shown as Wireless P2P in the diagram).

Various communication devices are operative to support communications with more than one of these various network types within the overall communication system or convergent network. Such communication devices may generally be referred to as relays that perform the appropriate conversion, transcoding, interfacing, etc. of signals received from and compliant with a first type of network in accordance with generating signals compliant with a second type of network; such a relay then forwards the newly generated signal via the second type of network. It is also noted that such relay functionality may be included within any desired communication device within the convergent network. While certain relays may be dedicated relays within the convergent network, any such type of communication device within the convergent network may include such relaying or interfacing functionality therein.

Of course, certain communications may be transmitted across multiple network interfaces and, as such, may undergo appropriate processing in accordance with more than one relay (e.g., from a first type of network to a second type of network, then from the second type of network to a third second type of network, etc.).

In certain communication devices that includes such relaying or interfacing functionality therein, a P1905.1 Layer may be implemented above the respective media access control (MAC) layers corresponding to two or more network types. For example, a P1905.1 Layer may be implemented above a first MAC layer corresponding to a WLAN and also above a second MAC layer corresponding to a MoCA network. Alternatively, a P1905.1 Layer may be implemented above a first MAC layer corresponding to a LAN or Ethernet network and also above a second MAC layer corresponding to a HomePlug network. Generally, for a relay device, such a P1905.1 Layer may be implemented above at least two MAC layers corresponding respectively to at least two types of networks within the convergent network. Of course, for a terminal device (e.g., one not implemented to effectuate relaying of frames between two or more interfaces), such a P1905.1 Layer may be implemented over a single MAC layer corresponding to one of the types of networks within the convergent network. In some embodiments, such a terminal device may also be implemented using a P1905.1 layer to allow the device to be seen as a P1905.1 device and to be controlled by the P1905.1 network management entity in accordance with a P1905.1 control protocol (e.g., so that the device will not be seen as a legacy device in the convergent network).

Herein, a novel architecture for is presented for use in convergent networks. It is noted that such architecture may be broadly applied to a variety of types of network in which various types of communication systems and/or communication networks may be interacting with one another (e.g., such as in accordance with a convergent home network (CHN)). Of course, such functionality may be broadly and generally applied to any types of communication systems and/or communication networks that interact with one another, including any such combination of the various types of communication systems, communication networks, such as with respect to FIG. 1. Also, the media employed for the various communication links and/or communication channels within such convergent networks may be varied including any one and/or any combination of the various types depicted with reference to FIG. 1.

In accordance with one embodiment, a convergent network may be managed as a bridged local area network (LAN) in which each respective communication system and/or communication network type is modeled generally as an Ethernet bridge. For example, instead of handling a convergent network as a flat mesh network, the convergent network may be managed as a bridged LAN, and each respective sub-network therein may be modeled as a respective Ethernet bridge.

In accordance with such an architecture, information related to path information and propagation of such information through the overall convergent network may be made for use in path selection among the various paths that may be available within the overall convergent network. For example, a mechanism is presented or defined to propagate the P1905.1 path information required for path selection between various nodes and/or bridges in the convergent network.

In one embodiment, this involves propagating the P1905.1 path information between neighboring bridges only, and this path selection propagating P1905.1 path metric information within the bridges through bridge specific transports. For example, in accordance with a convergent network (e.g., a convergent home network (CHN)), the architecture and functionality herein provides for a means to look at each node as a respective bridge and instead of creating a mesh architecture there among (which can be difficult to manage), a bridged LAN architecture is employed so that each respective sub-network therein may be modeled as a respective Ethernet bridge. Also, with this novel architecture and modeling, path selection is greatly facilitated and made more efficient.

Figure 5:
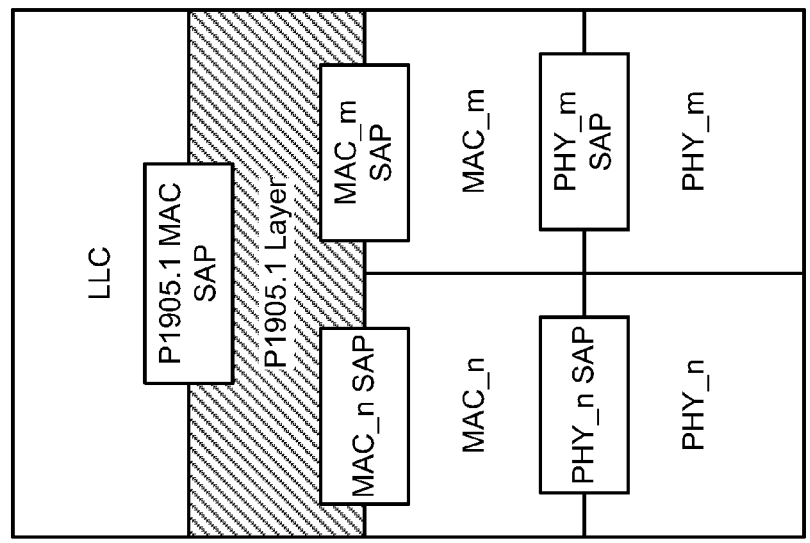
FIG. 5 illustrates an embodiment of abstraction layer as may be employed in accordance with convergent networks.

FIG. 5 illustrates an embodiment 500 of abstraction layer as may be employed in accordance with convergent networks. As may be seen in this diagram, the P1905.1 abstraction layer (AL) wraps and abstracts one or multiple media access control (MAC)/physical layers (PHYs) (e.g., wraps and abstracts one or more MAC/PHY interfaces). For the operating system (OS) standpoint, the P1905.1 AL may be viewed as being a single device exporting data and control service access points (SAPs) (e.g., such as may be operative in accordance with the function as application programming interfaces (APIs)).

In one embodiment, a unique (per P1905.1 network) 48_bit MAC address is allocated to the P1905.1 AL. As may be seen in the diagram, the hatched portion indicates the P1905 abstraction layer, which interfaces with a link layer control (LLC) layer.

Generally speaking, this is operative to create a virtual MAC, which is operative to control the convergence layer, so that the communication device looks like a single device to the upper layer(s). In addition, in accordance with such metrics as may be collected, selection of either the MAC_n or MAC_m may be made.

Figure 6:
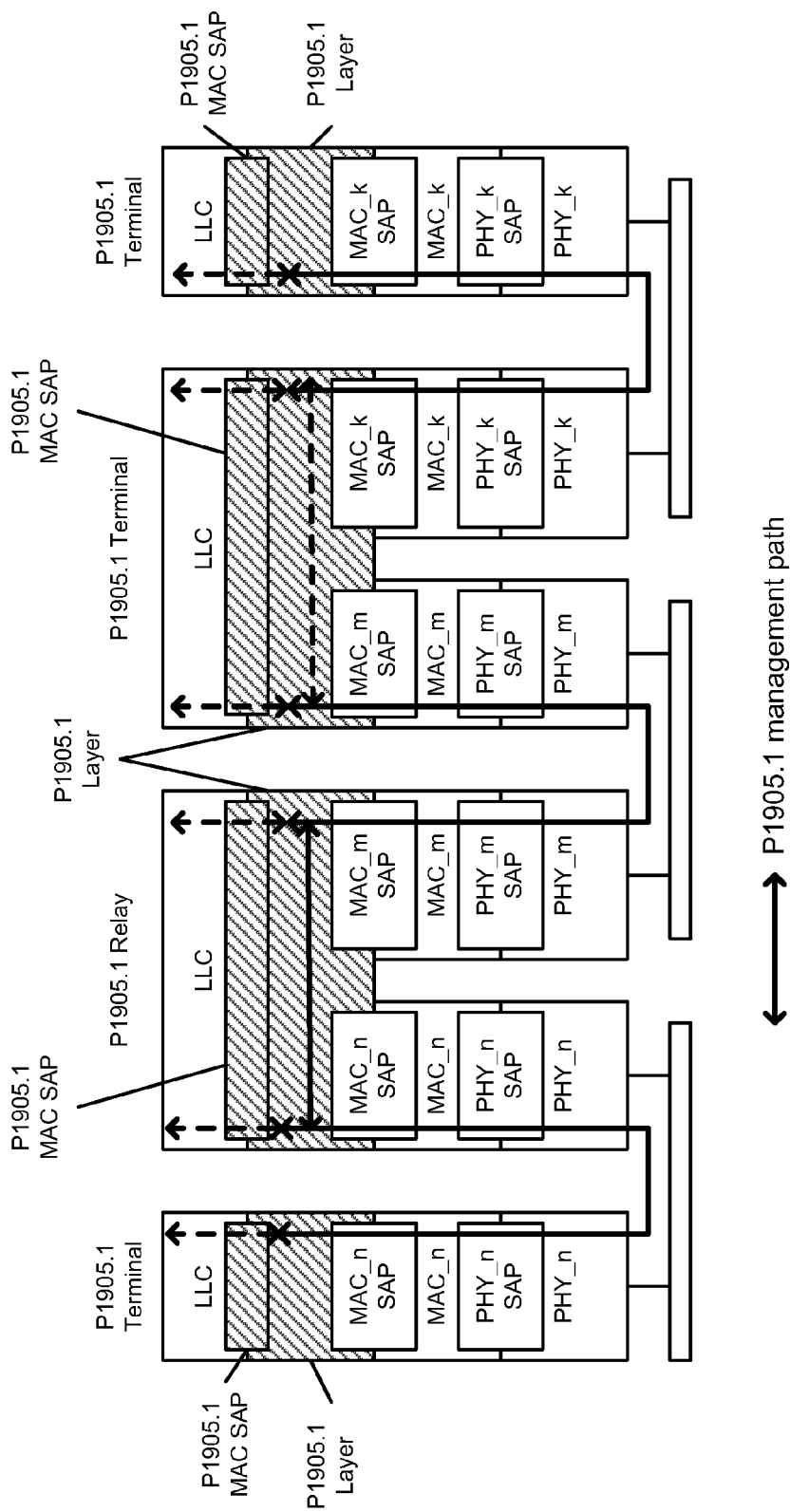
FIG. 6 illustrates an embodiment of an architecture as may be employed in accordance with convergent networks with respect to management and control.

FIG. 6 illustrates an embodiment 600 of an architecture as may be employed in accordance with convergent networks with respect to management and control. With respect to this diagram and the next, the differences between a relay and a terminal may be understood. As may be seen, a terminal can relay management frames but not data, yet a relay can relay both management frames and data. One example of a terminal may be a set top box (STB) (e.g., such as connected to a coaxial cable, power line, etc). If any such communication device within the convergent network cannot forward data, then such a communication device may be referred to generally as a terminal.

Figure 7:
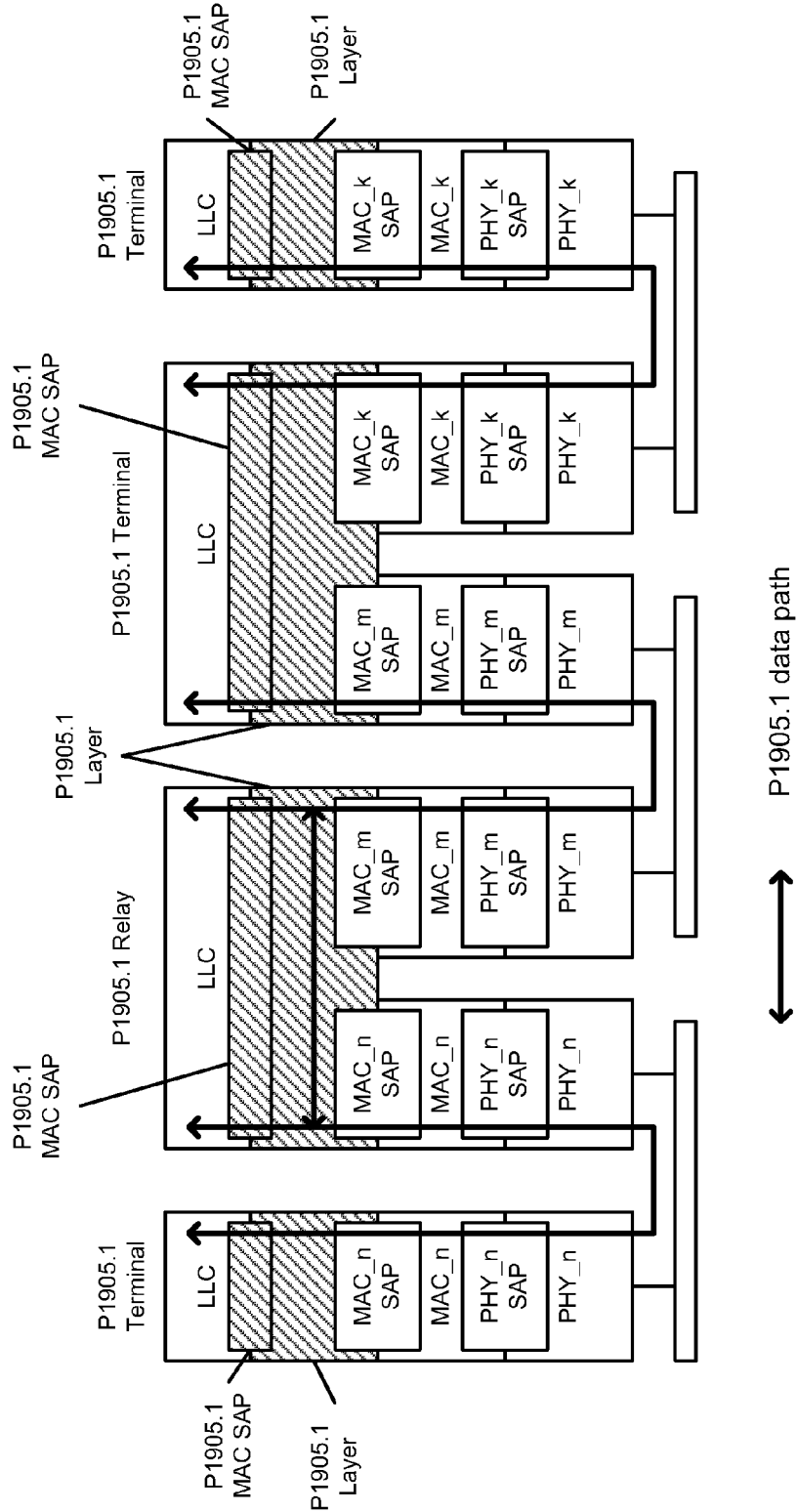
FIG. 7 illustrates an embodiment of an architecture as may be employed in accordance with convergent networks with respect to data communications.

FIG. 7 illustrates an embodiment 700 of an architecture as may be employed in accordance with convergent networks with respect to data communications.

Figure 8:
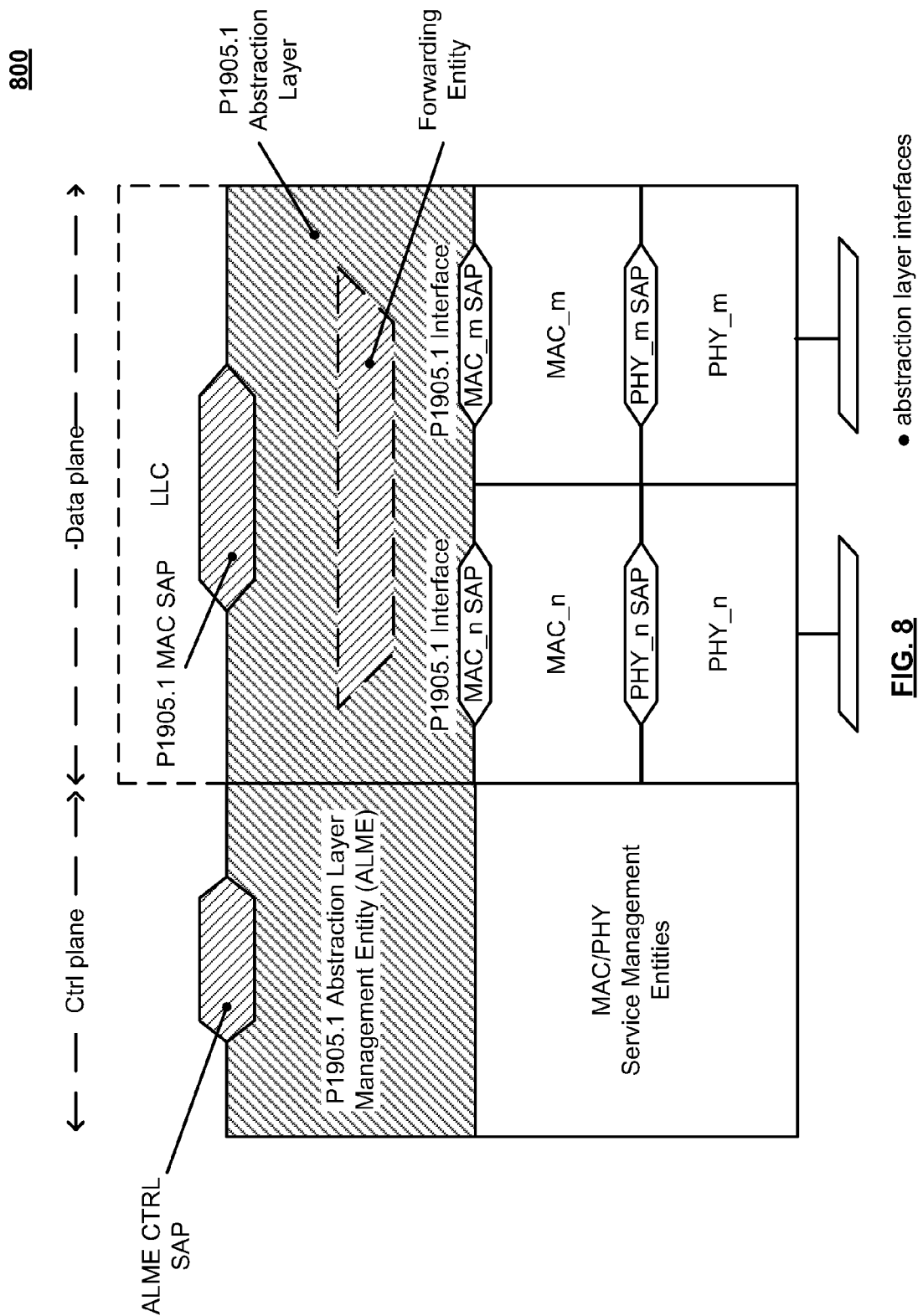
FIG. 8 illustrates an embodiment of abstraction layer interfaces as may be employed in accordance with convergent networks.

FIG. 8 illustrates an embodiment 800 of abstraction layer interfaces as may be employed in accordance with convergent networks. In considering a data plane and a control and/or management plane in accordance with such convergent networks, it is may be seen that a P1905.1 Abstraction Layer may be implemented to effectuate the interfacing between the respective MACs and the P1905.1 layer in the data plane. The P1905.1 Abstraction Layer interfaces with a link layer control (LLC) layer via a P1905.1 MAC SAP (Service Access Point). A number of respective MAC_i SAPs (Service Access Points from the P1905.1 Abstraction Layer to the underlying MACs) may be implemented between the MACs and the P1905.1 layer via a number of respective P.1905.1 interfaces (e.g., generally shown as MAC_n through MAC_m, which may include as few as one or as many as any desired integer number of MACs as shown on the right hand side associated with the data plane). The P1905.1 Abstraction Layer also includes a forwarding entity operative for forwarding communications between respective MAC_i's to which the P1905.1 Abstraction Layer interfaces via the respective P.1905.1 interfaces.

Also, these respective MAC_i SAPs interface communicate with a number of respective PHY_i's (e.g., generally shown as PHY_n through PHY_m, which may include as few as one or as many as any desired integer number of PHYs as shown on the right hand side associated with the data plane, and the number of PHY_i's including a same number of MAC_i's) via a number of respective PHY_i SAPs (Service Access Points). The respective PHY_i's may communicate with any of a number of other devices via one or more communication networks.

With respect to the control and/or management plane, a P1905.1 Abstraction Layer Management Entity (ALME) interfaces with the underlying MAC/PHY Service Management Entities (SMEs) as shown on the left hand side associated with the control or management plane.

FIG. 9 illustrates an embodiment 900 of various definitions as may be employed in accordance with convergent networks.

Figure 10:
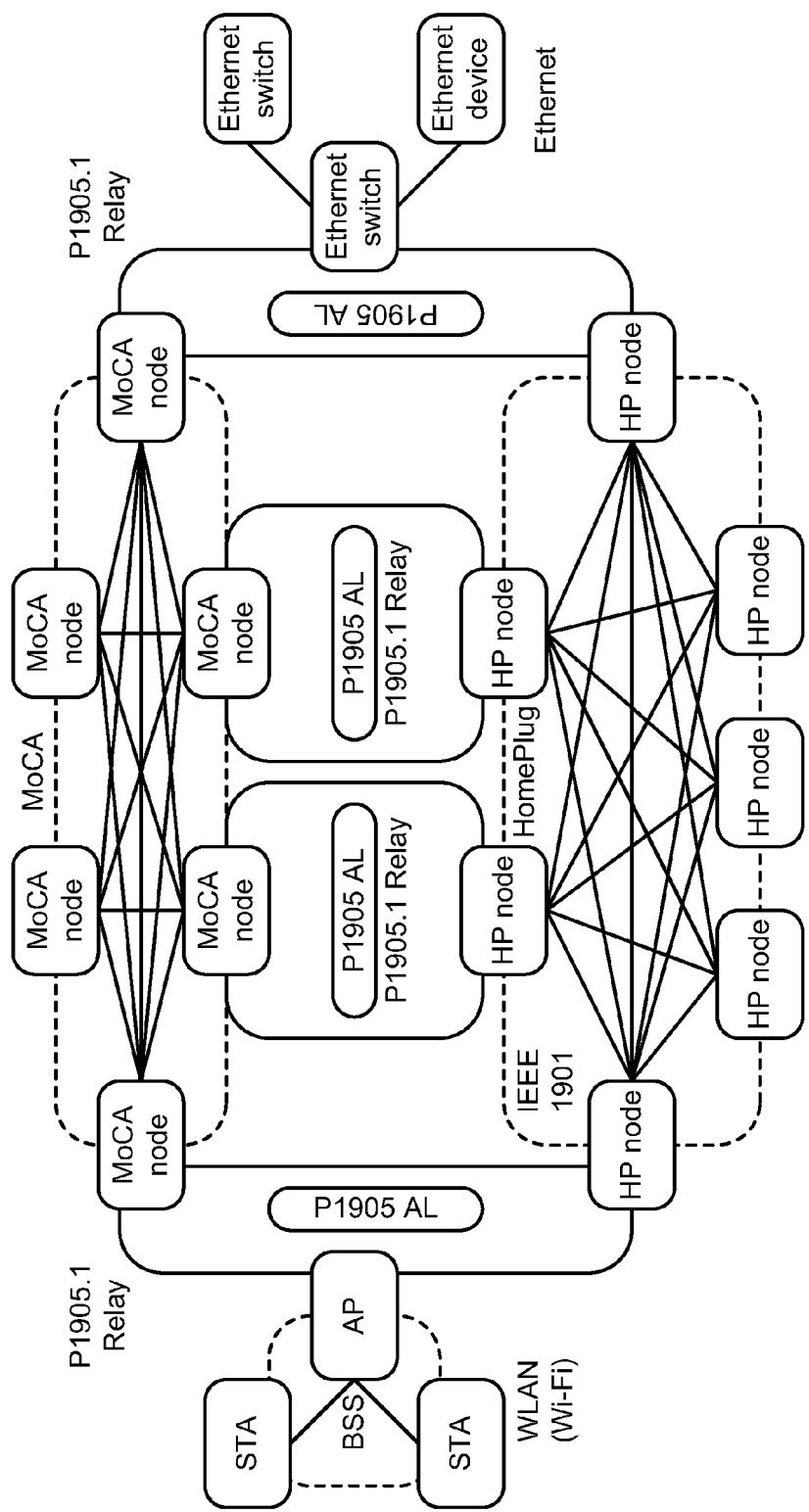
FIG. 10 illustrates an embodiment of a convergent network model.

FIG. 10 illustrates an embodiment 1000 of a convergent network model. This diagram has some similarities to the previous FIG. 4, and the reader is referred thereto for certain descriptions. As may be seen in this diagram, there are multiple ports (e.g., multiple MAC/PHYs) that are each respectively operative to treat each node as its own bridge, and the overall functionality is operative to create a large meshed network. As may be understood, there may lots of traffic between the respective nodes within the convergent network.

Figure 11:
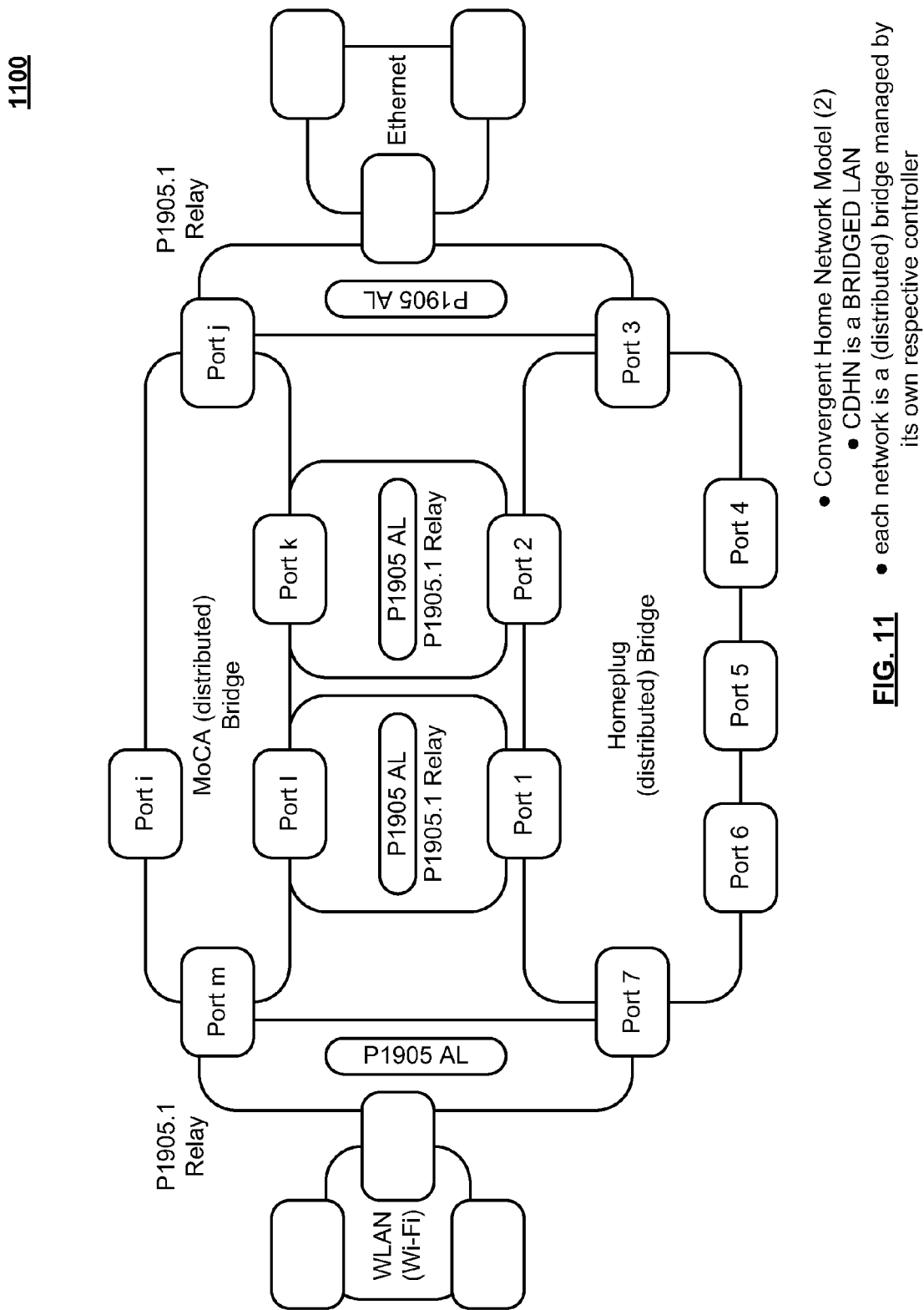
FIG. 11 illustrates an alternative embodiment of a convergent network model.

FIG. 11 illustrates an alternative embodiment 1100 of a convergent network model. This convergent network model shows a novel model in which a convergent digital home network (CDHN) is modeled as a bridged local area network (LAN). Each respective network type is then a (distributed) bridge that is operative to be managed by its own respective control entity. Such control entity may be any one of the respective communication devices within such a respective network type. In some embodiments, the control entity may actually have a distributed architecture and such control hardware, functionality, etc. may be implemented across more than one communication device.

Figure 12:
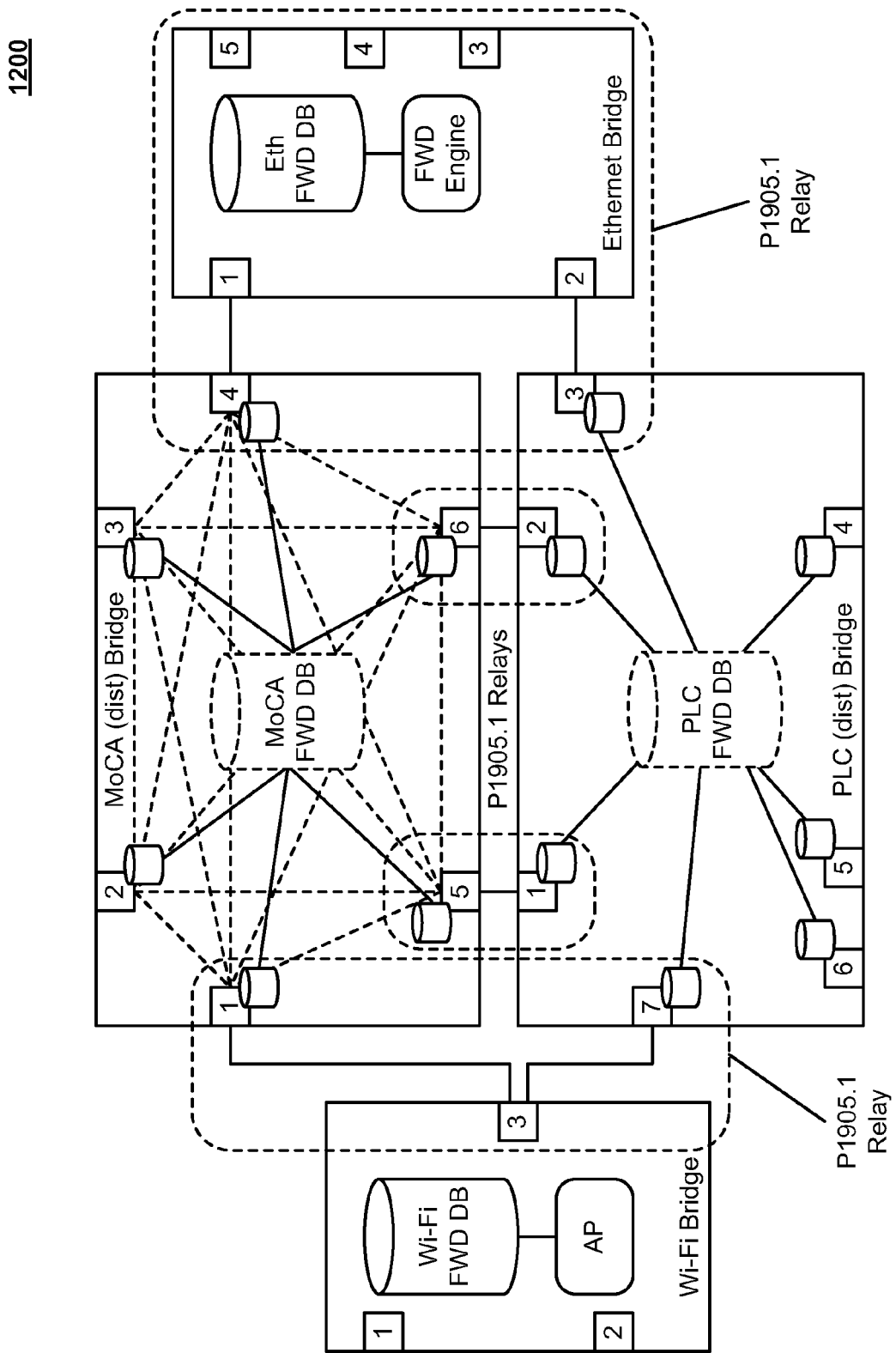
FIG. 12 illustrates an embodiment of bridges' forwarding (FWD) database.

FIG. 12 illustrates an embodiment 1200 of bridges' forwarding (FWD) database. As may be seen with respect to this diagram, each respective bridge natively is operative to maintain a forwarding and "link metrics" database (DB). For example, as shown in the diagram, the MoCA network includes a MoCA forwarding and "link metrics" database (shown as MoCA FWD DB), an Ethernet network includes an Ethernet forwarding and "link metrics" database (shown as Eth FWD DB), and so on in the overall convergent network.

Each respective DB is operative to perform the handling and control/management (e.g., address learning, aging, updating as needed, etc.) are specific to the bridge (including distributed bridges). Various "link metrics" computation are network specifics and could cover both prioritized quality of service (PRI QoS) and/or parameterized quality of service (pQoS).

Figure 13:
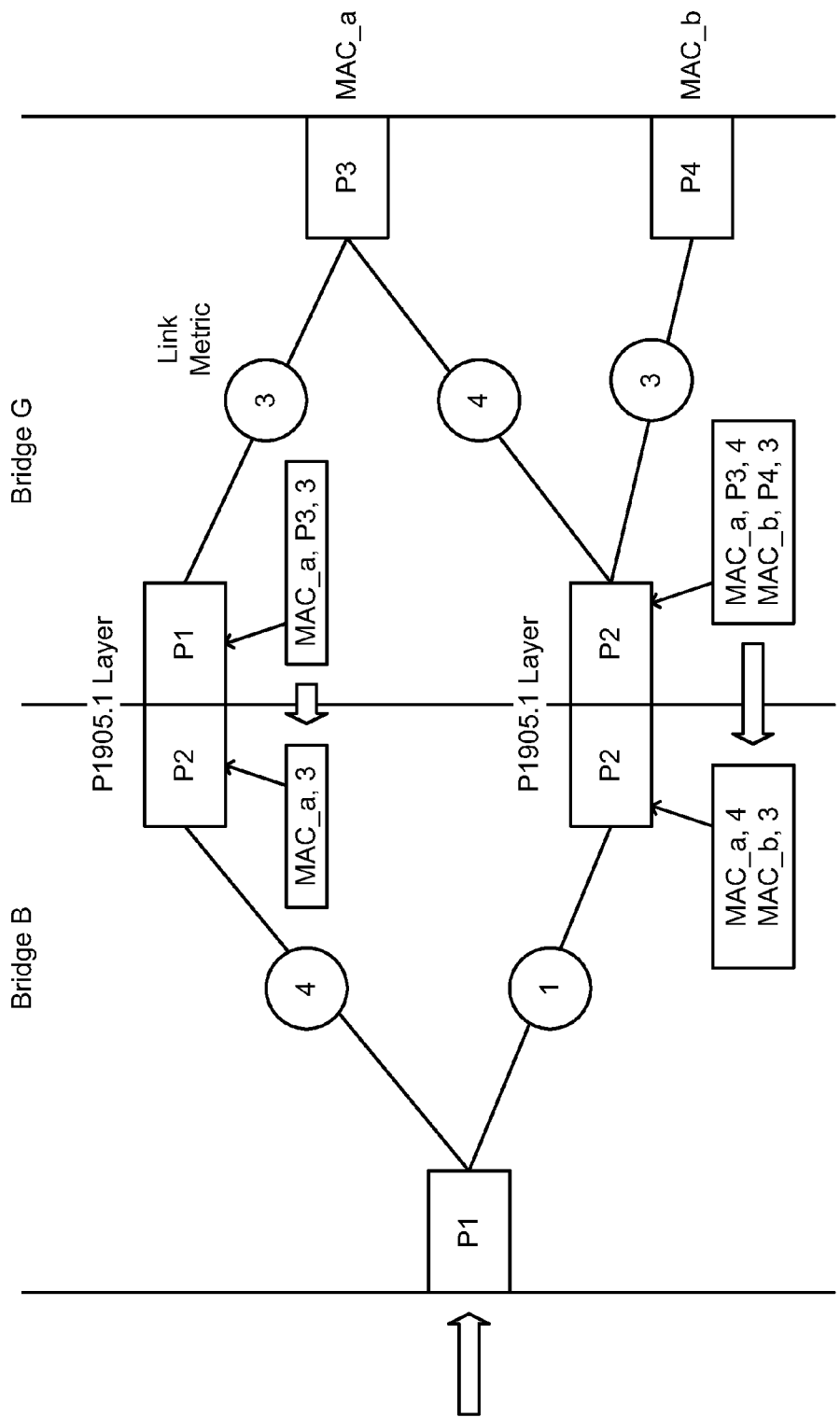
FIG. 13 illustrates an embodiment of forwarding (FWD) and link metrics information propagation as may be employed in accordance with convergent networks.

FIG. 13 illustrates an embodiment 1300 of forwarding (FWD) and link metrics information propagation as may be employed in accordance with convergent networks. As may be understood with respect to the diagram, the respective P1905.1 relays are operative to propagate their respective DBs between neighboring bridges.

It is noted that not only are the possible paths are employed herein, but also each respective path has at least one metric associated therewith. Therefore, with respect to each respective communication link by which communication may be effectuated between a first node and a second (e.g., perhaps via multiple communication links or hops), and each respective communication link has a corresponding and respective metric.

By using not only path information, but also the associated metric information associated with each respective communication link within the overall convergent network, it may be learned how to reach each respective node within the overall convergent network using the one or more metrics associated therewith, and the addresses as well as metrics may be passed to assist in decision making regarding which path to employ between two different nodes within the overall convergent network.

As may be understood, the metrics associated with the propagation of a bridge is therefore internal to the bridge (e.g., not outside of the respective bridge). Also, information between the bridges is only propagated through respective relays (e.g., a relay being a port connected to bridge to another port connected to another bridge). As the reader may understand, this allows for an architecture and model of such a convergent network not in accordance with a mesh pattern.

Figure 14:
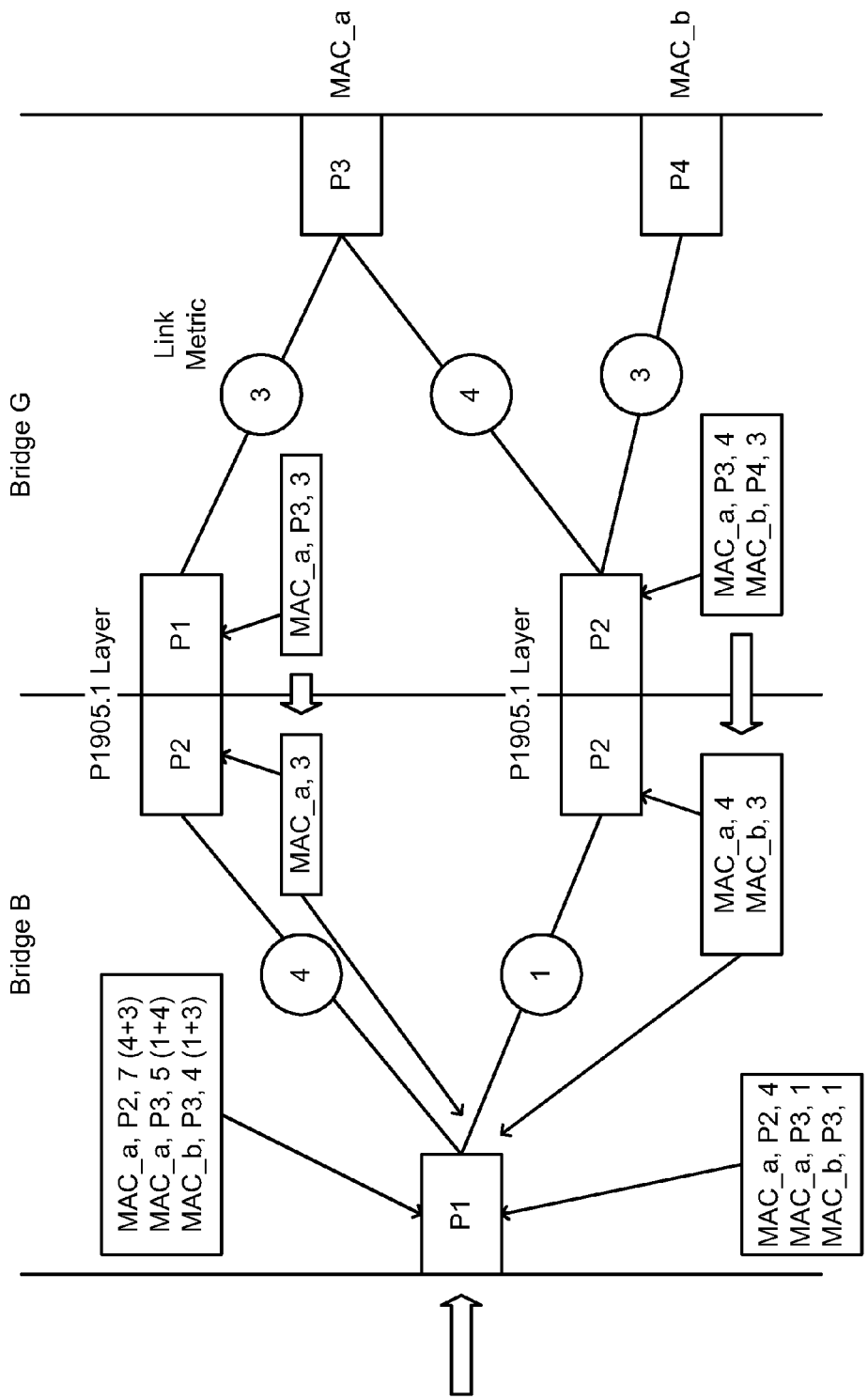
FIG. 14 illustrates an alternative embodiment of forwarding (FWD) and link metrics information propagation as may be employed in accordance with convergent networks.

FIG. 14 illustrates an alternative embodiment 1400 of forwarding (FWD) and link metrics information propagation as may be employed in accordance with convergent networks. The respective P1905.1 relays export the bridge's DB information between neighboring bridges only, and the neighboring bridges internally advertise such information via P1905.1 path metric L2 messages.

As may be seen, such respective information may get forwarded via multiple hops across the communication network and across multiple bridges.

Figure 15:
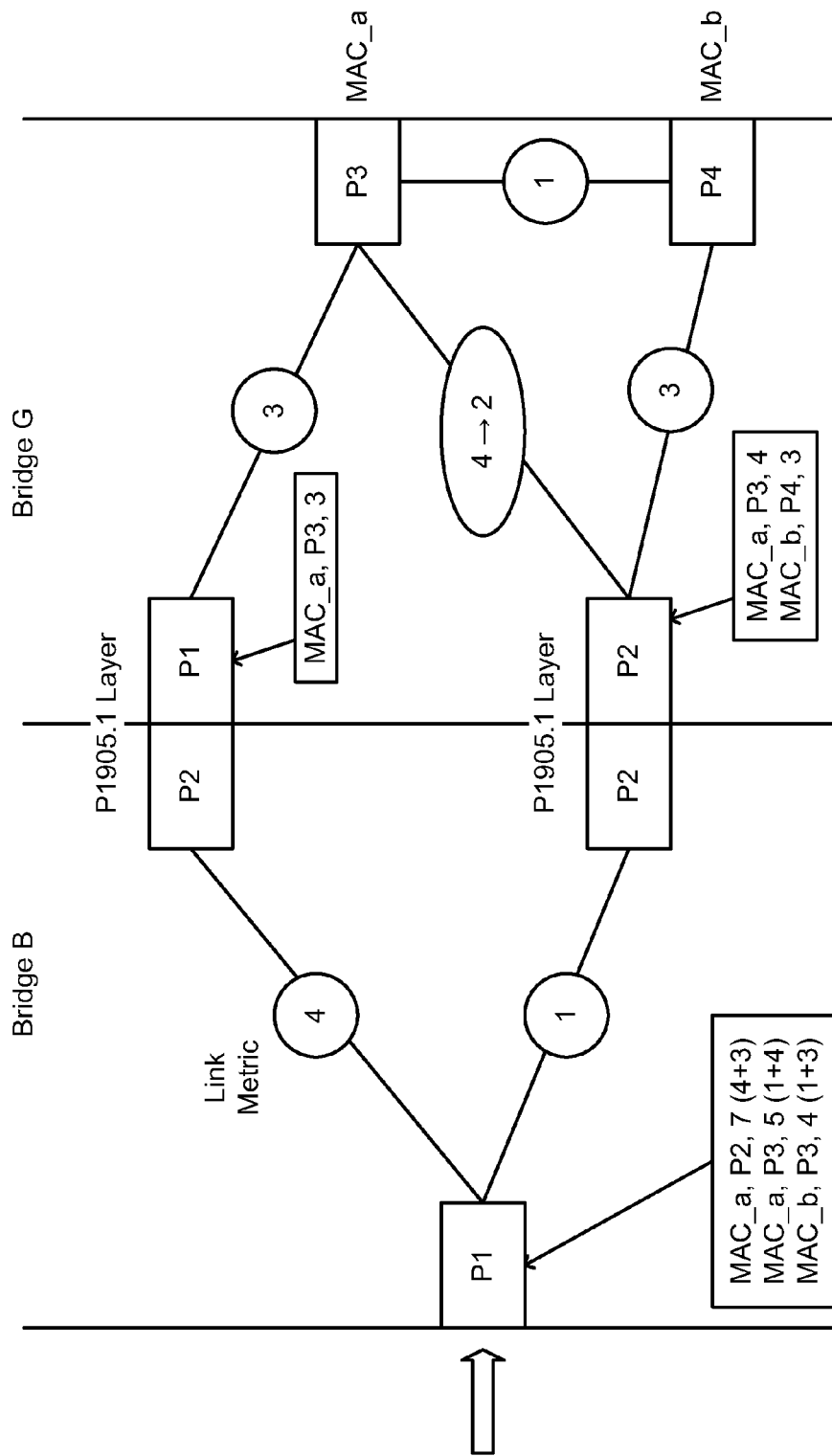
FIG. 15 illustrates an embodiment of forwarding (FWD) and link metrics information propagation update as may be employed in accordance with convergent networks.

FIG. 15 illustrates an embodiment 1500 of forwarding (FWD) and link metrics information propagation update as may be employed in accordance with convergent networks. This diagram shows how certain information within the respective DBs may undergo updating. Such updating may be performed periodically (e.g., in accordance with periodic update), such that a bridge's FWD DB is therefore queried by the neighboring bridge.

Such updating may be performed at the neighboring bridge rate. Also, such forwarding that is operative to effectuate internal change to a bridge does not necessarily trigger a DB update to the neighboring bridge if the one or more changes do not affect the external routing (e.g., such as with respect to relaying, link metric increase, etc.).

Figure 16:
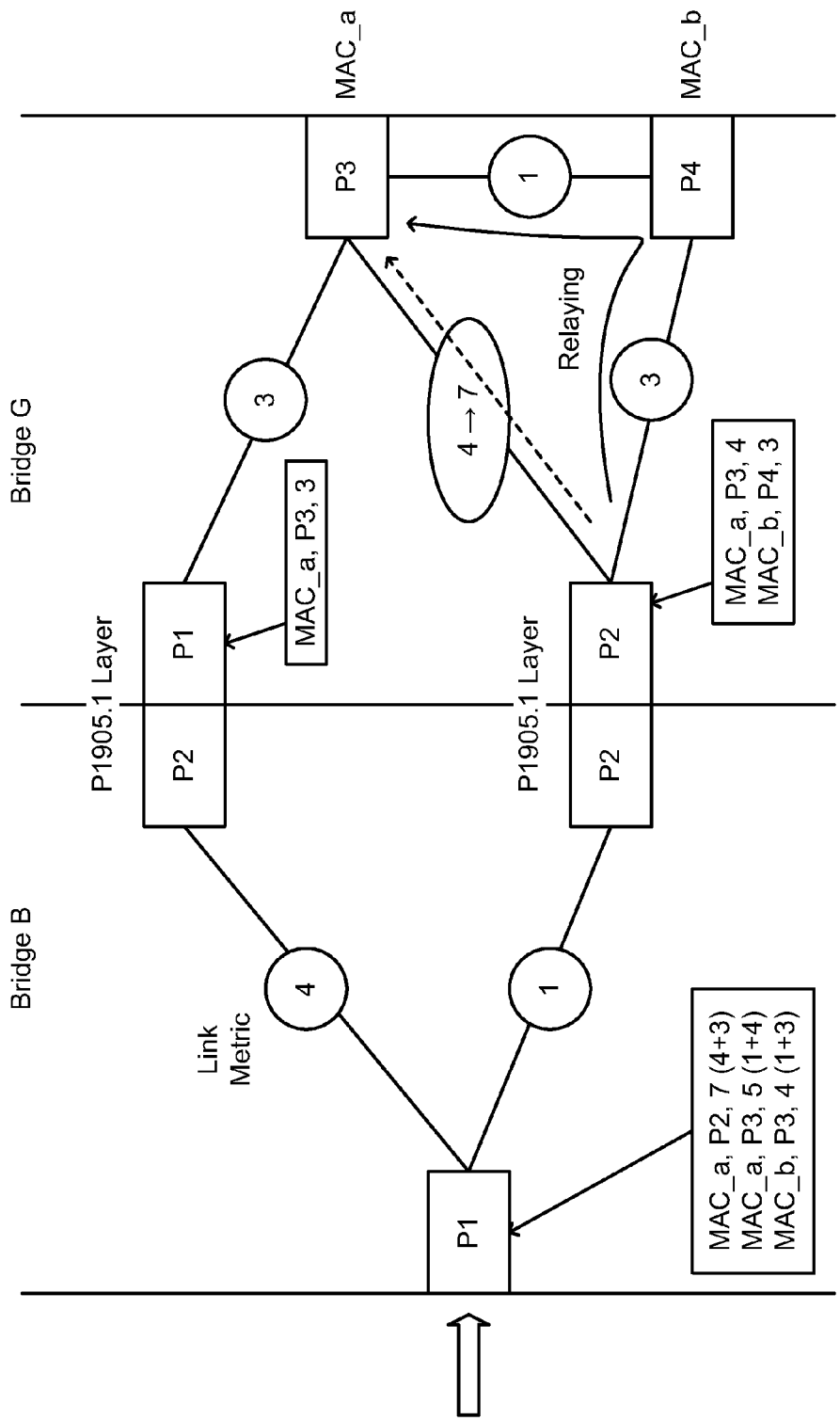
FIG. 16 illustrates an alternative embodiment of forwarding (FWD) and link metrics information propagation update as may be employed in accordance with convergent networks.

FIG. 16 illustrates an alternative embodiment 1600 of forwarding (FWD) and link metrics information propagation update as may be employed in accordance with convergent networks. This shows yet another embodiment by which certain information within the respective DBs may undergo updating (e.g., periodically in some embodiments). With respect to such periodical update, a bridge's FWD DB is queried by the neighboring bridge. As with respect to other embodiments, this may be performed at the neighboring bridge rate, and such forwarding that is operative to effectuate internal change to a bridge does not necessarily trigger a DB update to the neighboring bridge if the one or more changes do not affect the external routing (e.g., such as with respect to relaying, link metric increase, etc.).

With respect to the relative ranking/use of metrics herein, a higher metric is relatively worse, and a lower metric is relatively better (e.g., a metric of 7 is worse than a metric of 4, etc.).

As may be seen, the metric associated with the communication link from P2 to P3 degrades from 4 to 7. As such, relaying of communications from P2 to P3 may be effectuated via P4 (e.g., the 2 respective metrics associated with these two communication links are 3 and 1 for a total of 4 [metric of 3 from P2 to P4, and metric of 1 from P4 to P3]). This path (in accordance with relaying via P4) is therefore better/more desirable than the direct communication link path between P2 to P3 as may be seen with respect to their respective metrics.

Also, it is noted that such updating may be performed non-synchronously, in that, the update of the DB may be performed internally only to the relevant distributed bridge (e.g., need only update the change with respect to that internal DB). Of course, alternative embodiments may provide such update information external to the bridge for use by other bridges. However, it may be understood that such updating may be only internally the relevant distributed bridge in a preferred embodiment.

Figure 17:
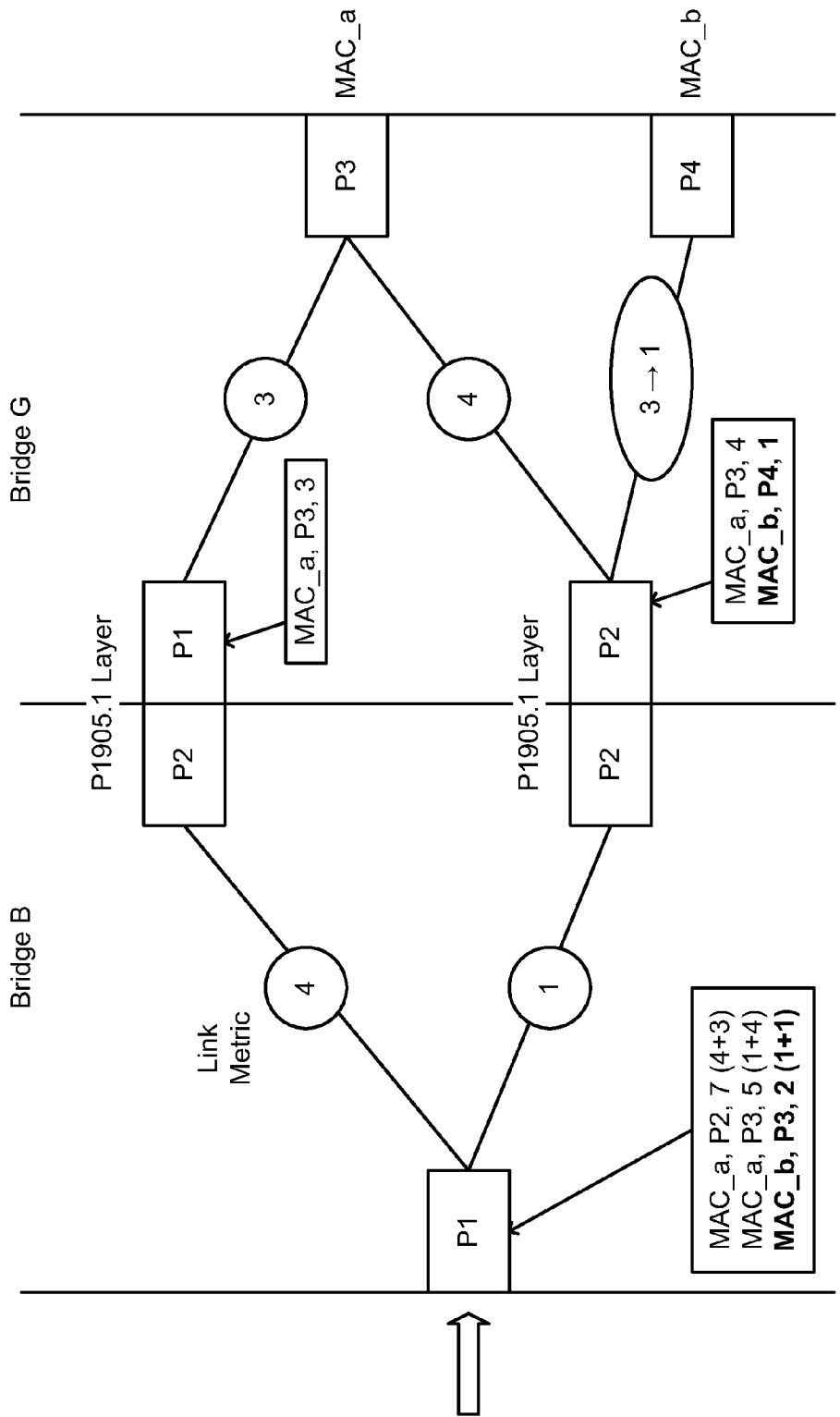
FIG. 17 illustrates an embodiment of bridges' path database update as may be employed in accordance with convergent networks.

FIG. 17 illustrates an embodiment 1700 of bridges' path database update as may be employed in accordance with convergent networks. This diagram deals with asynchronous update of respective metric information. For example, a bridge is operative to notify the neighboring bridges when its current ingress to egress path cannot be maintained anymore. This may be due to a variety of reasons including a decrease of the link metric, a broken link, etc.

With respect to the throughput availability of such an embodiment, the throughput availability could be based on a variety of parameters including one or both of (1) PRI QoS (priority QoS [e.g., such as that a packet has an associated priority, such as data vs. voice, and the functionality can forward the packet immediately, or via a certain path, etc.]) based on traffic statistics, transmit and/or receive counters, bit rate, and (2) pQoS (parameterized QoS such as in accordance with bandwidth reservation (e.g., in which a particular bandwidth is reserved and cannot be employed by any other devices)).

Also, a variety of types of metrics may be employed in various embodiments including:

Minimum/maximum (min/max) throughput
Standard Deviation of the min/max throughput (e.g., an indication of how constant is the min/max, such as a measure of the degree of the volatility of the respective communication link)
Delay/Latency (e.g., with respect to multiple hops)

On a P1905.1 relay, the MAC addresses are both the MACs addresses bridged locally, if any, and the MAC addresses bridged by the neighboring bridge. Therefore, the metrics associated to a given MAC address are then reachable through multiple bridge hops. These multiple bridge hops are then the combination of the metrics of multiple links such as the reported minimum/maximum throughput of the link being the common lowest maximum throughput of the successive links along the path, the reported latency being the accumulated latencies of the successive links along the path, etc.

The P1905 PATH DB relaying may be performed in a variety of manners including cyclic (configurable periodicity). Also, such PATH DB relaying may be performed via a 'round robin' manner between bounded MACs, that is pre-empt-able by the upper layers in case of (PATH_INFO) indication.

Alternatively, in another embodiment, if a 'round robin' mode of operation is not desired in a given application, then such relaying can be performed immediately (e.g., the 'round robin' order can be pre-empted).

Figure 18:
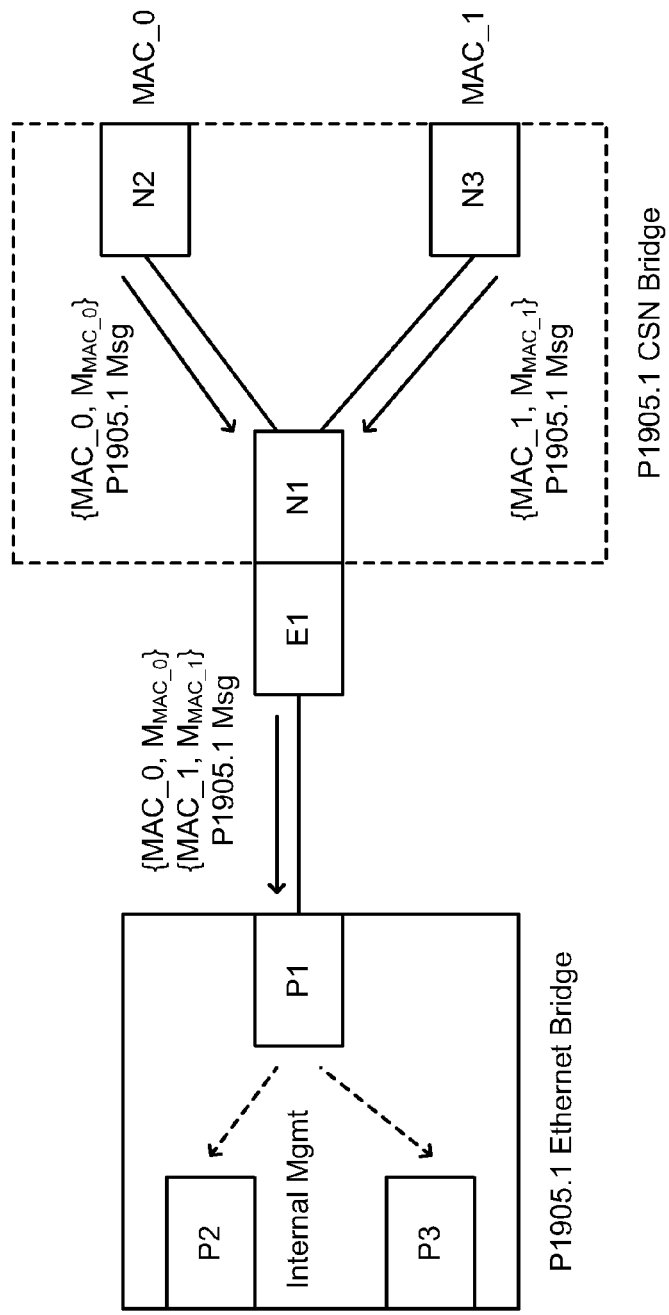
FIG. 18 illustrates an embodiment of path metric messages.

FIG. 18 illustrates an embodiment 1800 of path metric messages. The path metric messages are associated to the bridged MAC addresses are propagated throughout the convergent network (e.g., between the port/nodes of a distributed bridge, between bridges, etc.).

In some embodiments, such functionality does not modify the underlying MAC protocol. For example, when a given bridge MAC address is advertised, a CSN (coordinated shared network) architecture or model is effectuated in accordance with a shared network, operating in accordance with a collision free manner under common control so that any kind of network that looks the same among the convergent network.

One embodiment operates such that the respective network portions thereof (e.g., the respective communication system and/or communication network types) are modeled generally as respective Ethernet bridges. One example of a CSN is a common interacting MoCA and PLC/HP (Powerline/Home-Plug) convergent network.

As may be understood, certain underlying technology cannot add information to the message propagated via the convergent network (e.g., some technologies cannot add or include metrics and MAC addresses for use in accordance with the learning process).

However, in accordance with one embodiment herein, the learning process can be modified, for example, so that a MAC address can propagate along with some metric. Generally speaking, in accordance with operation of some technologies, such functionality is needed, while it may not be capable to be implemented and/or is not needed in accordance with other technologies.

In one embodiment, with respect to E1 and P1 in the diagram, operation in accordance with MoCA and PLC are operable to propagate an Ethernet frame, to effectuate bridge to bridge information between E1 and P1, etc.

Various types and manners of transport options may be employed. For example, one transport option involves sending such information over the underlying node-to-node message protocol (e.g., a preferred message protocol, etc). Some examples include MoCA's L2ME or Ctrl Msg, P1901 Ctrl Msg, LLTP for Ethernet to Ethernet Bridges, Wi-Fi Direct (point to point), etc.

Again, certain technologies may need an acknowledgement (ACK), while others may not. A mechanism may be employed by which the various technologies may be combined (e.g., regarding those technologies that may need certain things, and also regarding those technologies that may not need those things) to allow the underlying technology to determine what (if anything) to add with respect to any functionality and/or communications therein.

Another transport option involves sending through P1905.1 LLDP messages, such that no ACK/NACK is employed (e.g., in accordance with a communication device that sends LLDP and then forgets).

Another transport option involves sending through a new P1905.1 L2 protocol with ACK/NACK. For example, a lack of bridge topology information may exist (e.g., regarding which nodes belong to the same bridge). This information could be derived from the discovery topology protocol information to address the nodes of a given distributed bridge.

Figure 19:
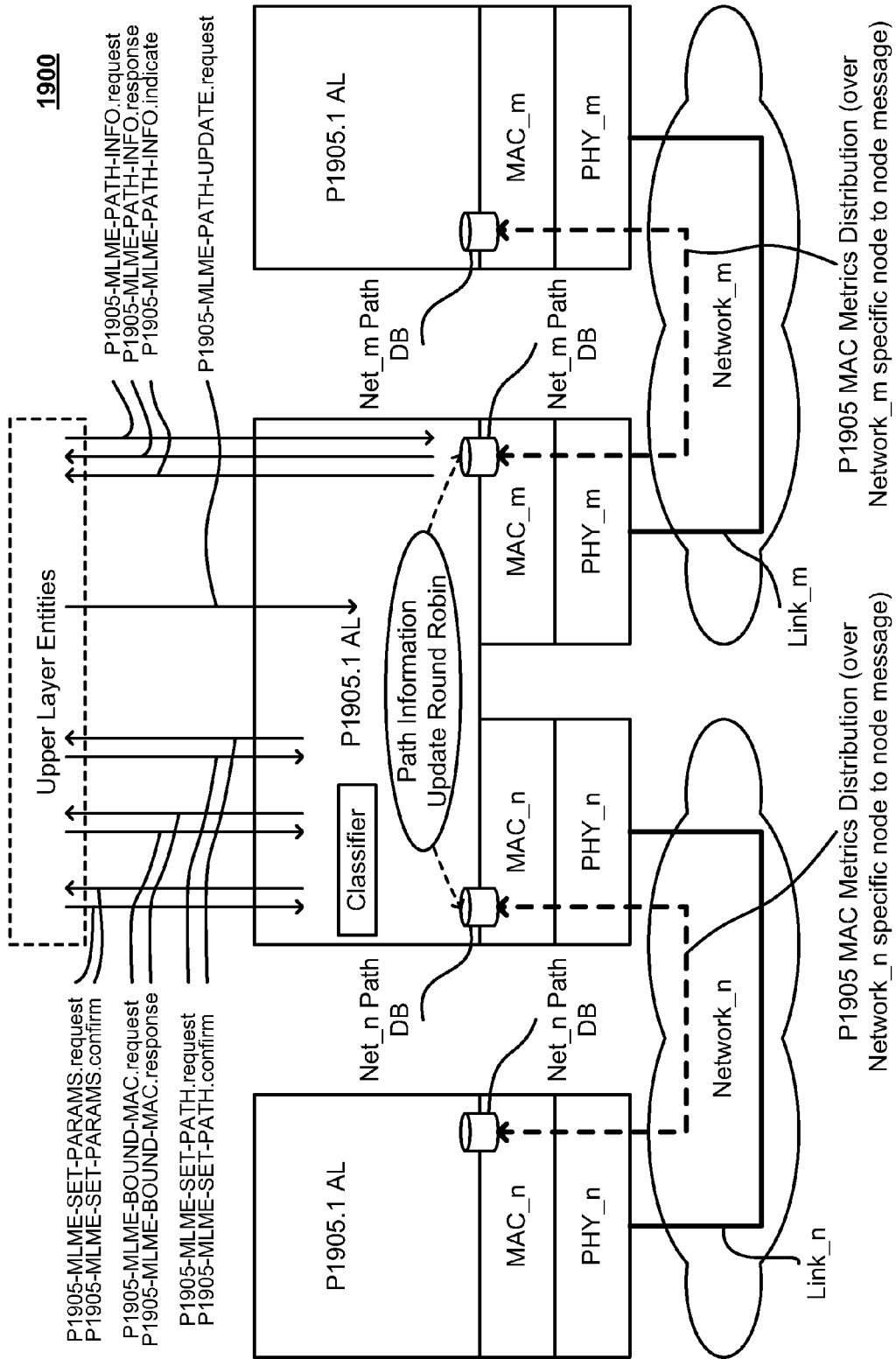
FIG. 19 illustrates an embodiment of application programming interfaces (APIs).

FIG. 19 illustrates an embodiment 1900 of application programming interfaces (APIs). Generally speaking, a network m herein m may be viewed or modeled as a distributed bridge. Within a given relay, there is an associated DB (or portion thereof) related to the path metrics thereof. The updating functionality may be performed in accordance with 'round robin' update or in accordance with some other manner (e.g., such as described elsewhere herein).

Various communications are made between the P1905.1 AL and upper layer entities as shown in the diagram. For one example, the SET PATH request and confirmation communications relate to management of the classifier (e.g., the forwarding entity). For one example, the MLME-PATH-INFO relates to a way for upper layer entities to check what's going on in the lower layer entities.

It is noted that the P1905 does not necessarily define path selection (protocol), but is does define the mechanisms that may be used to make needed information available, abstraction layer, and few mechanisms.

FIG. 20 illustrates an embodiment 2000 of media access control (MAC) sub-layer management entity (MLME) APIs.

Figure 21B:
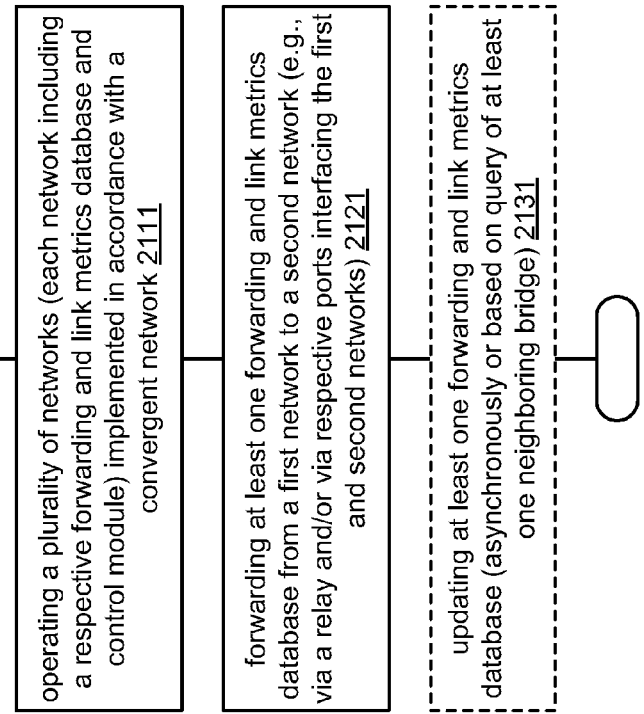
FIG. 21A and FIG. 21B illustrate various embodiment of methods for operating one or more devices within a convergent network.
Figure 21A:
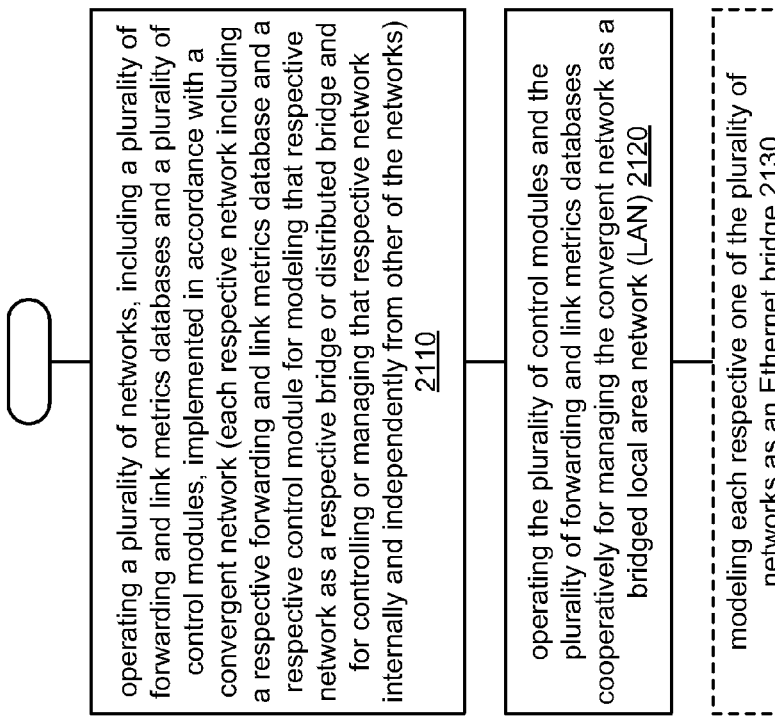

FIG. 21A and FIG. 21B illustrate various embodiment of methods for operating one or more devices within a convergent network.

Referring to method 2100 of FIG. 21A, the method 2100 begins by operating a plurality of networks, including a plurality of forwarding and link metrics databases and a plurality of control modules, implemented in accordance with a convergent network, wherein each respective one of the plurality of networks including a respective one of the plurality of forwarding and link metrics databases and a respective one of the plurality of control modules for modeling that respective one of the plurality of networks as a respective bridge or distributed bridge and for controlling or managing that respective one of the plurality of networks internally and independently from other of the plurality of networks, as shown in a block 2110.

The method 2100 continues by operating the plurality of control modules and the plurality of forwarding and link metrics databases cooperatively for managing the convergent network as a bridged local area network (LAN), as shown in a block 2120.

In certain embodiments, the method 2101 also operates by modeling each of the respective networks within the overall convergent network as an Ethernet bridge, as shown in a block 2130. For example, while a convergent network may include a number of individual and respective networks therein, each respective one of those networks may be modeled as an Ethernet bridge within the overall convergent network.

Referring to method 2101 of FIG. 21B, the method 2101 begins by operating a plurality of networks (each network including a respective forwarding and link metrics database and control module) implemented in accordance with a convergent network, as shown in a block 2111.

The method 2101 then operates by forwarding at least one forwarding and link metrics database from a first network to a second network, as shown in a block 2121. For example, such forwarding may be effectuated between two respective networks via a relay and/or via respective ports interfacing the first and second networks, such as corresponding to one or two respective communication devices within the overall convergent network.

In certain embodiments, the method 2101 also operates by updating at least one forwarding and link metrics database, as shown in a block 2131. For example, each respective network may be implemented as including a respective forwarding and link metrics database. Communications between the respective networks may sometimes be made such that any one of the forwarding and link metrics databases may be updated and/or modified based upon information provided from one or more other of the respective forwarding and link metrics databases associated with one or more of the other networks within the overall convergent network. Such updating may be performed asynchronously or based on a query made by any one or more neighboring bridge within the overall convergent network, as shown in a block 2131. For example, there may be instances in which a bridge associated with supporting communications with another network within the overall convergent network may query one or more other devices within the convergent network in an effort to achieve an update of a forwarding and link metrics database. As may be understood, updating and/or communication between respective networks within a convergent network may be made asynchronously or based on query of at least one neighboring bridge within the overall convergent network.

In some embodiments, such a processing module (which may be implemented in the same device or separate devices) can perform such processing to generate signals for transmission using at least one of any number of radios and at least one of any number of antennae to another wireless communication device (e.g., which also may include at least one of any number of radios and at least one of any number of antennae) in accordance with various aspects of the invention, and/or any other operations and functions as described herein, etc. or their respective equivalents. In some embodiments, such processing is performed cooperatively by a first processing module in a first device, and a second processing module within a second device. In other embodiments, such processing is performed wholly by a processing module (e.g., such as implemented within a singular device).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A communication device comprising:
   a communication interface; and
   a processor, at least one of the communication interface or the processor configured to:
   communicate with a first other communication device within a first communication network;
   communicate with a second other communication device within a second communication network that is different than the first communication network;
   employ an IEEE 1905.1 control protocol that is based on at least one version of an IEEE 1905.1 communication protocol to manage the first communication network independently from the second communication network and independently from any other communication device within the first communication network;
   manage the first communication network, including management of communications for at least one of the first other communication device or first at least one other communication device within the first communication network, independently from the second communication network and independently from any other communication device within the first communication network;
   maintain a first forwarding and link metrics database to model the first communication network as a first Ethernet bridge to the second other communication device;
   update the first forwarding and link metrics database based on information received from the second other communication device related to a second forwarding and link metrics database maintained by the second other communication device to model the second communication network as a second Ethernet bridge; and
   generate a frame for transmission to the second other communication device within the second communication network based on modeling of the second communication network as the second Ethernet bridge.

2. The communication device of claim 1, wherein the at least one of the processor or the communication interface is further configured to:
   receive information from the second other communication device that includes modeling of the second communication network as the second Ethernet bridge; and
   generate the frame based on the modeling of the second communication network as the second Ethernet bridge that is received from the second other communication device.

3. The communication device of claim 1, wherein the at least one of the processor or the communication interface is further configured to:
   support communications within at least one of a satellite communication system, a wireless communication system, a wired communication system, or a fiber-optic communication system.

4. The communication device of claim 1, wherein the at least one of the processor or the communication interface is further configured to:
   maintain a forwarding and link metrics database to model the first communication network as the first Ethernet bridge to the second other communication device, wherein the forwarding and link metrics database includes information corresponding to each of a plurality of communication links between a plurality of nodes within the first communication networks, and wherein the information is associated with at least one of throughput availability based on at least one of prioritized Quality of Service (QoS) and parameterized QoS and characterization of at least one of a maximum throughput, a standard deviation of maximum throughput, a delay and a latency.

5. The communication device of claim 1, wherein the at least one of the processor or the communication interface is further configured to:
   communicate with a third other communication device within the second communication network via the second other communication device within the second communication network operating as a bridge communication device.

6. The communication device of claim 1, wherein:
first communications within the first communication network are based on at least one of a first communication standard, a first communication protocol, or a first recommended practice; and
second communications within the second communication network are based on at least one of a second communication standard, a second communication protocol, or a second recommended practice.

7. The communication device of claim 1 further comprising:
a wireless local area network (WLAN/WiFi) bridge communication device, a multimedia over coax alliance (MoCA) bridge communication device, a local area network (LAN) bridge communication device, a HomePlug network bridge communication device, or a wireless point to point (P2P) system bridge communication device, wherein the first other communication device is a terminal device within the first communication network configured to relay only management frames, and the second other communication device is another bridge communication device configured to relay both management and data frames.

8. The communication device of claim 1, wherein the first communication network is a multimedia over coax alliance (MoCA) network or a HomePlug network, and the second communication network is a wireless point to point (P2P) system, a local area network (LAN), or a wireless local area network (WLAN/WiFi).

9. A communication device comprising:
a communication interface; and
a processor, at least one of the communication interface or the processor configured to:
communicate with a first other communication device within a first communication network;
communicate with a second other communication device within a second communication network that is different than the first communication network;
employ an IEEE 1905.1 control protocol that is based on at least one version of an IEEE 1905.1 communication protocol to manage the first communication network, including management of communications for at least one of the first other communication device or first at least one other communication device within the first communication network, independently from the second communication network and independently from any other communication device within the first communication network;
maintain a first forwarding and link metrics database to model the first communication network as a first Ethernet bridge to the second other communication device;
update the first forwarding and link metrics database based on information received from the second other communication device related to a second forwarding and link metrics database maintained by the second other communication device to model the second communication network as a second Ethernet bridge; and
generate a frame for transmission to the second other communication device within the second communication network based on modeling of the second communication network as the second Ethernet bridge including the update of the first forwarding and link metrics database.

10. The communication device of claim 9, wherein the forwarding and link metrics database includes information corresponding to each of a plurality of communication links between a plurality of nodes within the first communication networks, and wherein the information is associated with at least one of throughput availability based on at least one of prioritized Quality of Service (QoS) and parameterized QoS and characterization of at least one of a maximum throughput, a standard deviation of maximum throughput, a delay and a latency.

11. The communication device of claim 9, wherein the at least one of the processor or the communication interface is further configured to:
communicate with a third other communication device within the second communication network via the second other communication device within the second communication network operating as a bridge communication device.

12. The communication device of claim 9 further comprising:
a wireless local area network (WLAN/WiFi) bridge communication device, a multimedia over coax alliance (MoCA) bridge communication device, a local area network (LAN) bridge communication device, a HomePlug network bridge communication device, or a wireless point to point (P2P) system bridge communication device, wherein the first other communication device is a terminal device within the first communication network configured to relay only management frames, and the second other communication device is another bridge communication device configured to relay both management and data frames.

13. The communication device of claim 9, wherein the first communication network is a multimedia over coax alliance (MoCA) network or a HomePlug network, and the second communication network is a wireless point to point (P2P) system, a local area network (LAN), or a wireless local area network (WLAN/WiFi).

14. A method for execution by a communication device, the method comprising:
communicating with a first other communication device within a first communication network;
communicating with a second other communication device within a second communication network that is different than the first communication network;
employing an IEEE 1905.1 control protocol that is based on at least one version of an IEEE 1905.1 communication protocol to manage the first communication network independently from the second communication network and independently from any other communication device within the first communication network;
managing the first communication network, including management of communications for at least one of the first other communication device or first at least one other communication device within the first communication network, independently from the second communication network and independently from any other communication device within the first communication network;
maintaining a first forwarding and link metrics database to model the first communication network as a first Ethernet bridge to the second other communication device;
updating the first forwarding and link metrics database based on information received from the second other communication device related to a second forwarding and link metrics database maintained by the second other communication device to model the second communication network as a second Ethernet bridge; and generating a frame for transmission to the second other communication device within the second communication network based on modeling of the second communication network as the second Ethernet bridge.

15. The method of claim 14 further comprising:
receiving information from the second other communication device that includes modeling of the second communication network as the second Ethernet bridge; and
generating the frame based on the modeling of the second communication network as the second Ethernet bridge that is received from the second other communication device.

16. The method of claim 14 further comprising:
supporting communications within at least one of a satellite communication system, a wireless communication system, a wired communication system, or a fiber-optic communication system.

17. The method of claim 14 further comprising:
communicating with a third other communication device within the second communication network via the second other communication device within the second communication network operating as a bridge communication device.

18. The method of claim 14, wherein:
first communications within the first communication network are based on at least one of a first communication standard, a first communication protocol, or a first recommended practice; and
second communications within the second communication network are based on at least one of a second communication standard, a second communication protocol, or a second recommended practice.

19. The method of claim 14, wherein the communication device is a wireless local area network (WLAN/WiFi) bridge communication device, a multimedia over coax alliance (MoCA) bridge communication device, a local area network (LAN) bridge communication device, a HomePlug network bridge communication device, or a wireless point to point (P2P) system bridge communication device, and wherein the first other communication device is a terminal device within the first communication network configured to relay only management frames, and the second other communication device is another bridge communication device configured to relay both management and data frames.

20. The method of claim 14, wherein the first communication network is a multimedia over coax alliance (MoCA) network or a HomePlug network, and the second communication network is a wireless point to point (P2P) system, a local area network (LAN), or a wireless local area network (WLAN/WiFi).

* * * * *